(12) United States Patent
Corazza et al.

(10) Patent No.: US 9,747,495 B2
(45) Date of Patent: Aug. 29, 2017

(54) SYSTEMS AND METHODS FOR CREATING AND DISTRIBUTING MODIFIABLE ANIMATED VIDEO MESSAGES

(71) Applicant: Adobe Systems Incorporated, San Jose, CA (US)

(72) Inventors: Stefano Corazza, San Francisco, CA (US); Daniel Babcock, San Jose, CA (US); Charles Pina, San Francisco, CA (US); Sylvio Drouin, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 132 days.

(21) Appl. No.: 13/787,541

(22) Filed: Mar. 6, 2013

(65) Prior Publication Data

US 2013/0235045 A1 Sep. 12, 2013

Related U.S. Application Data

(60) Provisional application No. 61/749,193, filed on Jan. 4, 2013, provisional application No. 61/607,377, filed on Mar. 6, 2012.

(51) Int. Cl.
*G06T 13/40* (2011.01)
*G06K 9/00* (2006.01)
(Continued)

(52) U.S. Cl.
CPC ..... *G06K 9/00315* (2013.01); *G06K 9/00228* (2013.01); *G06K 9/00288* (2013.01);
(Continued)

(58) Field of Classification Search
None
See application file for complete search history.

(56) References Cited

U.S. PATENT DOCUMENTS 6,047,078 A 4/2000 Kang
6,088,042 A 7/2000 Handelman et al.
(Continued)

FOREIGN PATENT DOCUMENTS

EP 1884896 A2 2/2008
WO 2007132451 A2 11/2007
(Continued)

OTHER PUBLICATIONS

Persson, Per. "Exms: an animated and avatar-based messaging system for expressive peer communication." Proceedings of the 2003 international ACM SIGGROUP conference on Supporting group work. ACM, 2003.*

(Continued)

*Primary Examiner* — Ryan M Gray
(74) *Attorney, Agent, or Firm* — Keller Jolley Preece

(57) ABSTRACT

Systems and methods in accordance with embodiments of the invention enable collaborative creation, transmission, sharing, non-linear exploration, and modification of animated video messages. One embodiment includes a video camera, a processor, a network interface, and storage containing an animated message application, and a 3D character model. In addition, the animated message application configures the processor to: capture a video sequence using the video camera; detect a human face within a sequence of video frames; track changes in human facial expression of a human face detected within a sequence of video frames; map tracked changes in human facial expression to motion data, where the motion data is generated to animate the 3D character model; apply motion data to animate the 3D character model; render an animation of the 3D character model into a file as encoded video; and transmit the encoded video to a remote device via the network interface.

27 Claims, 12 Drawing Sheets

(51) Int. Cl.
*G06K 9/62* (2006.01)
*G06T 17/20* (2006.01)
*G06T 19/20* (2011.01)

(52) U.S. Cl.
CPC ............ *G06K 9/6256* (2013.01); *G06T 13/40* (2013.01); *G06T 17/205* (2013.01); *G06T 19/20* (2013.01)

(56) References Cited

U.S. PATENT DOCUMENTS

| | | | |
|---|---|---|---|
| 6,278,466 B1 | 8/2001 | Chen | |
| 6,466,215 B1* | 10/2002 | Matsuda ................. | G06T 13/40 345/473 |
| 6,535,215 B1 | 3/2003 | DeWitt et al. | |
| 6,552,729 B1 | 4/2003 | Di Bernardo et al. | |
| 6,554,706 B2 | 4/2003 | Kim et al. | |
| 6,700,586 B1 | 3/2004 | Demers | |
| 6,714,200 B1 | 3/2004 | Talnykin et al. | |
| 7,149,330 B2* | 12/2006 | Liu et al. ....................... | 382/118 |
| 7,168,953 B1 | 1/2007 | Poggio et al. | |
| 7,209,139 B1 | 4/2007 | Keet et al. | |
| 7,372,536 B2 | 5/2008 | Shah et al. | |
| 7,522,165 B2 | 4/2009 | Weaver | |
| 7,937,253 B2 | 5/2011 | Anast et al. | |
| 8,390,628 B2* | 3/2013 | Harding et al. ............. | 345/474 |
| 8,704,832 B2 | 4/2014 | Taylor et al. | |
| 8,744,121 B2* | 6/2014 | Polzin et al. ................. | 382/103 |
| 8,749,556 B2 | 6/2014 | de Aguiar et al. | |
| 8,797,328 B2 | 8/2014 | Corazza et al. | |
| 8,928,672 B2 | 1/2015 | Corazza et al. | |
| 8,982,122 B2 | 3/2015 | Corazza et al. | |
| 2001/0000779 A1 | 5/2001 | Hayama et al. | |
| 2002/0050988 A1 | 5/2002 | Petrov et al. | |
| 2002/0102024 A1 | 8/2002 | Jones et al. | |
| 2003/0164829 A1 | 9/2003 | Bregler et al. | |
| 2003/0169907 A1 | 9/2003 | Edwards et al. | |
| 2003/0208116 A1 | 11/2003 | Liang et al. | |
| 2003/0215130 A1 | 11/2003 | Nakamura et al. | |
| 2004/0021660 A1 | 2/2004 | Ng-Thow-Hing et al. | |
| 2004/0049309 A1 | 3/2004 | Gardner et al. | |
| 2004/0210427 A1 | 10/2004 | Marschner et al. | |
| 2004/0227752 A1 | 11/2004 | McCartha et al. | |
| 2005/0264572 A1 | 12/2005 | Anast et al. | |
| 2006/0002631 A1 | 1/2006 | Fu et al. | |
| 2006/0109274 A1 | 5/2006 | Alvarez et al. | |
| 2006/0134585 A1 | 6/2006 | Adamo-villani et al. | |
| 2006/0171590 A1 | 8/2006 | Lu et al. | |
| 2006/0245618 A1 | 11/2006 | Boregowda et al. | |
| 2006/0267978 A1 | 11/2006 | Litke et al. | |
| 2007/0091085 A1 | 4/2007 | Wang et al. | |
| 2007/0104351 A1 | 5/2007 | Yang et al. | |
| 2007/0167779 A1 | 7/2007 | Kim et al. | |
| 2007/0182736 A1 | 8/2007 | Weaver | |
| 2008/0024487 A1 | 1/2008 | Isner et al. | |
| 2008/0030497 A1 | 2/2008 | Hu et al. | |
| 2008/0031512 A1 | 2/2008 | Mundermann et al. | |
| 2008/0043021 A1 | 2/2008 | Huang et al. | |
| 2008/0152213 A1 | 6/2008 | Medioni et al. | |
| 2008/0158224 A1 | 7/2008 | Wong et al. | |
| 2008/0170077 A1 | 7/2008 | Sullivan et al. | |
| 2008/0170078 A1* | 7/2008 | Sullivan et al. ............. | 345/473 |
| 2008/0180448 A1 | 7/2008 | Anguelov et al. | |
| 2008/0187246 A1 | 8/2008 | Andres Del Valle | |
| 2008/0252596 A1 | 10/2008 | Bell et al. | |
| 2008/0284779 A1* | 11/2008 | Gu et al. ....................... | 345/419 |
| 2009/0027337 A1 | 1/2009 | Hildreth | |
| 2009/0067730 A1 | 3/2009 | Schneiderman | |
| 2009/0195544 A1 | 8/2009 | Wrinch | |
| 2009/0196466 A1 | 8/2009 | Capata et al. | |
| 2009/0202114 A1* | 8/2009 | Morin et al. ................. | 382/118 |
| 2009/0202144 A1 | 8/2009 | Taub et al. | |
| 2009/0231347 A1 | 9/2009 | Omote | |
| 2010/0007665 A1* | 1/2010 | Smith et al. ................. | 345/473 |
| 2010/0020073 A1 | 1/2010 | Corazza et al. | |
| 2010/0073361 A1 | 3/2010 | Taylor et al. | |
| 2010/0134490 A1* | 6/2010 | Corazza et al. ............. | 345/420 |
| 2010/0141662 A1* | 6/2010 | Storey et al. ................. | 345/473 |
| 2010/0149179 A1 | 6/2010 | Aguiar et al. | |
| 2010/0203968 A1 | 8/2010 | Gill et al. | |
| 2010/0235045 A1 | 9/2010 | Craig et al. | |
| 2010/0238182 A1 | 9/2010 | Geisner et al. | |
| 2010/0253703 A1 | 10/2010 | Ostermann | |
| 2010/0259547 A1 | 10/2010 | De Aguiar et al. | |
| 2010/0271366 A1* | 10/2010 | Sung ................. | H04N 1/00307 345/419 |
| 2010/0278405 A1 | 11/2010 | Kakadiaris et al. | |
| 2010/0285877 A1 | 11/2010 | Corazza | |
| 2011/0211729 A1 | 9/2011 | Ramalingam et al. | |
| 2011/0292034 A1 | 12/2011 | Corazza et al. | |
| 2011/0296331 A1 | 12/2011 | Iyer et al. | |
| 2011/0304622 A1 | 12/2011 | Rogers et al. | |
| 2012/0019517 A1 | 1/2012 | Corazza et al. | |
| 2012/0038628 A1 | 2/2012 | Corazza et al. | |
| 2012/0130717 A1* | 5/2012 | Xu et al. ....................... | 704/258 |
| 2012/0327091 A1* | 12/2012 | Eronen et al. ............... | 345/473 |
| 2013/0021348 A1 | 1/2013 | Corazza et al. | |
| 2013/0100140 A1* | 4/2013 | Ye et al. ....................... | 345/473 |
| 2013/0127853 A1 | 5/2013 | Corazza et al. | |
| 2013/0215113 A1* | 8/2013 | Corazza et al. ............. | 345/420 |
| 2013/0235045 A1 | 9/2013 | Corazza et al. | |
| 2013/0257877 A1 | 10/2013 | Davis | |
| 2013/0271451 A1 | 10/2013 | Tong et al. | |
| 2014/0035934 A1* | 2/2014 | Du et al. ....................... | 345/474 |
| 2014/0043329 A1 | 2/2014 | Wang et al. | |
| 2014/0160116 A1 | 6/2014 | De Aguiar et al. | |
| 2014/0204084 A1 | 7/2014 | Corazza et al. | |
| 2014/0285496 A1 | 9/2014 | De Aguiar et al. | |
| 2014/0313192 A1 | 10/2014 | Corazza et al. | |
| 2014/0313207 A1 | 10/2014 | Taylor et al. | |
| 2016/0163084 A1 | 6/2016 | Corazza | |

FOREIGN PATENT DOCUMENTS

| | | |
|---|---|---|
| WO | 2009007701 A1 | 1/2009 |
| WO | 2010060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |

OTHER PUBLICATIONS

Jones, Michael, and Paul Viola. "Fast multi-view face detection." Mitsubishi Electric Research Lab TR-20003-96 3 (2003): 14.*
Weise, Thibaut, et al. "Realtime performance-based facial animation." ACM Transactions on Graphics (TOG). vol. 30. No. 4. ACM, 2011.*
International Search Report for International Application No. PCT/US 09/57155, date completed Dec. 22, 2009, date mailed Jan. 12, 2010, 5 pgs.
International Search Report for International Application No. PCT/US 09/65825, date completed Jan. 21, 2010, date mailed Jan. 28, 2010, 3 pgs.
International Search Report for International Application PCT/US2011/045060, completed Nov. 27, 2011, 2 pgs.
International Search Report for PCT/US2010/033797, filed May 5, 2010, report completed Jun. 11, 2010, 2 pgs.
Written Opinion of the International Searching Authority for International Application No. PCT/US 09/57155, date completed Dec. 22, 2009, date mailed Jan. 12, 2010, 6 pgs.
Written Opinion of the International Searching Authority for International Application No. PCT/US 09/65825, date completed Jan. 21, 2010, date mailed Jan. 28, 2010, 6 pgs.
Written Opinion of the International Searching Authority for International Application No. PCT/US2010/033797, filed May 5, 2010, completed Jun. 11, 2010, 4 pgs.
Written Opinion of the International Searching Authority for International Application No. PCT/US2011/045060, completed Nov. 27, 2011, 5 pgs.

(56) References Cited

OTHER PUBLICATIONS

Aguiar, E. De et al., "Automatic Conversion of Mesh Animations into Skeleton-based Animations", Eurographics 2008, vol. 27, No. 2, Apr. 2008.
Anguelov et al., "Recovering Articulated Object Models from 3D Range Data", in Proceedings of the 20th Conference on Uncertainty in Artificial Intelligence, UAI 2004, 18-26.
Anguelov et al., "Scape: Shape Completion and Animation of People", Proceedings of the SIGGRAPH Conference, 2005.
Anguelov et al., "The Correlated Correspondence Algorithm for Unsupervised Registration of Nonrigid Surfaces", Advance in Neural Information Processing Systems, 17, 2004, pp. 33-40.
Baran et al, "Automatic rigging and animation of 3D characters", ACM Transactions on Graphics (TOG)—Proceedings of ACM SIGGRAPH 2007, vol. 26, Issue 3, Jul. 2007.
Beaudoin, et al., "Adapting Wavelet Compression to Human Motion Capture Clips", GI '07 Proceedings of Graphics Interface, 2007, 6 pages.
Blanz et al., "A Morphable Model for the Synthesis of 3D Faces", in Proceedings of ACM SIGGRAPH 11999, 8 pgs., 1999.
Bray, Joseph, "Markerless Based Human Motion Capture: A Survey", Published 2001, 44 pgs.
Buenaposada et al., "Performance Driven Facial Animation Using Illumination Independent Appearance-Based Tracking", in Proceedings of ICPR, Hong Kong, Aug. 2006, 4 pgs.
Cheung et al., "Shape-from Silhouette of Articulated Objects and its use for Human Body Kinematics Estimation and Motion Capture", in Conference on Computer Vision and Pattern Recognition (CVPR), pp. 77-84, 2003.
Curio et al., "Semantic 3D Motion Retargeting for Facial Animation", ACM 2006, 8 pgs.
Curless et al., Allen, "The Space of Human Body Shapes: Reconstruction and Parameterization from Range Scans", ACM Transactions on Graphics, 22(3), pp. 587-594, 2003.
Curless et al., "A Volumetric Method of Building Complex Models from Range Images", Retrieved from http://graphics.stanford.edu/papers/volrange/volrange.pdf, pp. 1-10, 1996.
Curless et al., Allen, "Articulated Body Deformation from Range Scan Data", ACM Transactions on Graphics, 21(3), 612-619, 2002.
Davis et al., "Filing Holes in Complex Surfaces Using Volumetric Diffusion", Proc. First Symposium on 3D Data Processing, Visualization, and Transmission, 2002, pp. 1-11.
De Aguiar et al., "Marker-Less 3D Feature Tracking for Mesh-Based Human Motion Caption", Human Motion 2007, LNCS 4818, 2007, 1-15.
Di Bernardo et al., "Generating Realistic Human Motions from Observations", submitted to Fifth European Conf. on Computer Vision, ECCV 1998, pp. 1-12.
Gao et al., "Motion normalization: the Preprocess of Motion Data", 2005, pp. 253-256.
Garland et al., "Surface Simplification Using Quadric Error Metrics", Proceedings of SIGGRAPH 1997, pp. 209-216, 1997.
Goncalves et al., Reach Out and Touch Space (Motion Learning), Automatic Face and Gesture Recognition, 1998, Proceedings. Third IEEE International Conference on Apr. 14-16, 1998, pp. 234-239.
Hahnel et al., "An Extension of the ICP Algorithm for Modeling Nonrigid Objects with Mobile Robots", Proceedings of the International Joint Conference on Artificial Intelligence (IJCAI), 2003, 6pgs.
Hilton et al., "From 3D Shape Capture to Animated Models", First International Symposium on 3D Processing, Visualization and Transmission (3DVPT2002), 2002.
Ju, et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pages.
Kahler et al., "Head Shop: Generating Animated Head Models with Anatomical Structure", ACM SIGGRAPH Symposium on Computer Animation, pp. 55-64, 2002.
Lewis, "H.264/MPEG-4 AVC CABAC overview", http://www.theonlineoasis.co.uk/notes.html, Dec. 3, 2012.
Lewis et al., "Pose Space Deformation: A Unified Approach to Shape Interpolation and Skeleton-Drive Deformation", Proceedings of ACM SIGGRAPH 2000, pp. 165-172, 2000.
Liepa, P., "Filing Holes in Meshes", Proc. of the Eurographics/ACM SIGGRAPH Symposium on Geometry Processing, pp. 200-205, 2003.
Ma et al., "An Invitation to 3D Vision", Springer Verlag, pp. 15-28, 2004.
Mamou et al., "Temporal DCT-based compression of 3D Dynamic Meshes", ICCOM'06 Proceedings of the 10th WSEAS international conference on Communications, Jul. 10-12, 2006, 74-79.
Mamou et al., "The New MPEG-4/FAMC Standard for Animated 3D Mesh Compression", IEEE 3DTV-CON'08, May 2008.
Max Planck Institut Informatik, "Automatic Conversion of Mesh Animations into Skeleton-based Animations", http://www.mpiinf.mpg.de/-edeaguia/animation_eg08.html; Mar. 30, 2008, 9pgs.
Mohr et al., "Building Efficient, Accurate Character Skins from Examples", ACM Transactions on Graphics, 22(3), pp. 562-568, 2003.
Noh et al., "Expression Cloning", Proceedings of ACM SIGGRAPH 2001, pp. 277-288, 2001.
Okada, R. et al., "A Video Motion Capture System for Interactive Games.", MVA2007 IAPR Conference on Machine Vision Applications, Tokyo, Japan, May 16-18, 2007, 4 pgs.
Park et al., "On-line locomotion generation based on motion blending", ACM SIGGRAPH Symposium on Computer Animation. San Antonio, Jul. 21, 2002, 8 pages.
Park et al., "On-line motion blending for real-time locomotion generation", Computer Animation & Virtual Worlds. Wiley, UK, vol. 15, No. 3-4, Jul. 2004, 14 pages.
Popovic et al., "Style-Based Inverse Kinematics", ACM Transactions on Graphics, 23(3), pp. 522-531, 2004.
Safonova et al., "Construction and optimal search of interpolated motion graphs", ACM SIGGRAPH, 2007, 11 pgs.
Sand et al., "Continuous Capture of Skin Deformation", ACM Transactions on Graphics, 22(3), pp. 578-586, 2003.
Scholkopf et al., "A Tutorial on support Vector Regression", in Technical Report NC2-TR-1998-030. NeuroCOLT2, Oct. 1998.
Seo et al., "An Automatic Modeling of Human Bodies from Sizing Parameters", in Symposium on Interactive 3D Graphics, 2003, pp. 19-26.
Sloan et al., "Shape by Example", in 2001 Symposium on Interactive 3D Graphics, pp. 135-144, 2001.
Smola et al., "A Tutorial on Support Vector Regression", Statistics and Computing London 14(3) pp. 199-222, 2004.
Sumner et al., "Deformation Transfer for Triangle Meshes", Proceedings of ACM SIGGRAPH 2004, 23(3), pp. 399-405, 2004.
Szliski et al., "Matching 3D Anatomical Surfaces with Non-rigid Deformations Using Octree-Splines", International Journal of Computer Vision, 1996, 18,2, pp. 171-186.
Tao, Ju et al., "Mean Value Coordinates for Closed Triangular Meshes", Proceedings of ACM SIGGRAPH (2005), 6 pgs.
Taylor et al., "Modeling Human Motion Using Binary Latent Variables", Proc. of Advances in Neural Information Processing Systems (NIPS) 19, 8 pgs., 2006.
Tung et al., "Topology Matching for 3D Video Compression Computer Vision and Pattern Recognition", IEEE Conference Computer Vision and Pattern Recognition, 2007, Jun. 2007, 8 pgs.
Vasilescu et al., "Multilinear Analysis of Image Ensembles: Tensorfaces", European Conference on Computer Vision (ECCV), pp. 447-460, 2002.
Vlasic et al., "Face Transfer with Multilinear Models", ACM Transactions on Graphics 24(3), pp. 426-433, 2005.
Vlasic et al., "Multilinear Models for Facial Synthesis", SIGGRAPH Research Sketch, 2004.
Von Luxburg, "A Tutorial on Spectral Clustering. Statistics and Computing", 2007, 32 pgs.
Wang et al., "Multi-weight Enveloping: Least Squares Approximation Techniques for Skin Animation", ACM SIGGRAPH Symposium on Computer Animation, pp. 129-138, 2002.
Zhidong et al., "Control of motion in character animation", Jul. 14 2004, 841-848.

(56) References Cited

OTHER PUBLICATIONS

Baran, "Using Rigging and Transfer to Animate 3D Characters", Department of Electrical Engineering and Computer Science Massachusetts Institute of Technology, Sep. 2010.
Blanz et al., "Reanimating faces in images and video." Computer Graphics Forum. vol. 22 No. 3. Blackwell Publishing, Inc., 2003.
Grassia, "Believable Automatically Synthesized Motion by Knowledge-Enhanced Motion Transformation", Thesis CMU-CS-00-163, Aug. 21, 2000, 220 pages.
Isidro et al., "Stochastic Refinement of the Visual Hull to Satisfy Photometric and Silhouette Consistency Constraints" Boston University Computer Science Tech. Report No. 2003-017, Jul. 31, 2003.
Kalogerakis, "Machine Learning Algorithms for Geometry Processing by Example", Thesis submitted Graduate Department of Computer Science University of Toronto, 2010.
Liu et al., "3D Motion Retrieval with Motion Index Tree", Computer Vision and Image Understanding, vol. 92, Issues 2-3, Nov.-Dec. 2003, pp. 265-284.
Lum et al., "Combining Classifiers for Bone Fracture Detection in X-Ray Images", Image Processing, 2005, ICIP 2005, IEEE International Conference on (vol. 1) Date of Conference: Sep. 11-14, 2005, pp. 1149-1152.
Seitz et al., "A comparison and evaluation of multi-view stereo reconstruction alogrithms," Computer vision and pattern recognition, 2006 IEEE Computer Society Conference on vol. 1, IEEE, 2006.
Weise et al., "Realtime Performance-Based Facial Animation." ACM Transactions on Graphics (TOG) vol. 30, No. 4, ACM (2011).
Wikipedia, "Morph target animation", Last Modified Aug. 1, 2014, Printed Jan. 16, 2015, 3 pgs.
Zordan et al., "Dynamic Response for Motion Capture Animation", ACM Transactions on Graphics—Proceedings of ACM SIGGRAPH 2005, vol. 24, Issue 3, Jul. 2005, pp. 697-701.
U.S. Appl. No. 13/681,120, filed Mar. 17, 2015, Office Action.
U.S. Appl. No. 13/773,344, filed May 23, 2014, Office Action.
U.S. Appl. No. 14/222,390, filed May 22, 2014, Office Action.
U.S. Appl. No. 14/222,390, filed Oct. 16, 2014, Office Action.
U.S. Appl. No. 14/222,390, filed Apr. 10, 2015, Office Action.
U.S. Appl. No. 14/222,390, filed Oct. 29, 2015, Office Action.
U.S. Appl. No. 13/681,120, filed Jun. 1, 2016, Office Action.
Weise, Thibaut, et al. "Face/off: Live facial puppetry." Proceedings of the 2009 ACM SIGGRAPH/Eurographics Symposium on Computer animation. ACM, 2009.
U.S. Appl. No. 14/222,390, filed Mar. 23, 2016, Office Action.
U.S. Appl. No. 13/681,120, filed Dec. 1, 2015, Office Action.
Tena, J. Rafael, Fernando De la Torre, and Lain Matthews. "Interactive Region-Based Linear 3D Face Models." ACM Transactions on Graphics (TOG). vol. 30. No. 4. ACM, 2011.
U.S. Appl. No. 14/222,390, filed Oct. 26, 2016, Office Action.
U.S. Appl. No. 15/044,970, filed Jul. 11, 2016, Preinterview 1st OA.
U.S. Appl. No. 15/044,970, filed Dec. 1, 2016, Notice of Allowance.
Hasler et al. "A Statistical Model of Human Pose and Body Shape", Journal compilation © 2008 The Eurographics Association and Blackwell Publishing Ltd.
Liu et al., "Background surface estimation for reverse engineering of reliefs." International Journal of CAD/CAM 7.1 (2009).
Zhu "Shape Recognition Based on Skeleton and Support Vector Machines", ICIC 2007, CCIS 2, pp. 1035-1043, 2007.© Springer-Verlag Berlin Heidelberg 2007.
U.S. Appl. No. 13/681,120, filed May 16, 2017, Office Action.

\* cited by examiner

SYSTEMS AND METHODS FOR CREATING AND DISTRIBUTING MODIFIABLE ANIMATED VIDEO MESSAGES

CROSS-REFERENCE TO RELATED APPLICATIONS

The present application claims priority to U.S. Provisional Application Ser. No. 61/607,377 entitled "Automated System for the Collaborative Creation and Distribution of Animated Content" to Drouin et al., filed Mar. 6, 2012. The present application also claims priority to U.S. Provisional Application Ser. No. 61/749,193 entitled "Systems and Methods for Animated Video Messages" to Corazza et al., filed Jan. 4, 2013. The disclosures of U.S. patent application Ser. Nos. 61/607,377 and 61/749,193 are hereby incorporated by reference herein in their entirety.

FIELD OF THE INVENTION

The present invention relates generally to computer generated graphics and more specifically to generating virtual character animations.

BACKGROUND

The generation of 3D content and in particular of 3D animated content is becoming increasingly popular. Despite this trend, creating 3D characters that can be animated is still typically left to artists with specialized training.

A 3D character is typically composed using one or more meshes, a skeleton and skinning weights. A mesh is typically a set of polygons defining the surface of an object, which often serves as the appearance of a 3D character. An object can be a character or any other discrete element in 3D visualization. A skeleton is typically a set of rigid items, or "bones", generally under the mesh of an object, analogous to anatomical bones. These skeleton bones are typically bonded to the mesh in order to provide motion to the 3D character model. Rigging is the process of creating a suitable skeleton for a character, binding the skeleton to the character mesh using skinning weights and defining forward kinematic parameters or inverse kinematic parameters that determine how the character moves. The animation of a rigged 3D character involves applying motion data to the character's skeleton to drive the character's mesh. The generation of animations can be technically challenging and is often performed by artists with specialized training.

Patterns within computer generated 3D content can be found utilizing Principal Components Analysis (PCA). PCA is a process that utilizes an orthogonal transformation to convert a dataset of values into a set of values of linearly uncorrelated variables called principal components. A set of values expressed in terms of the principal components can be referred to as a feature vector. A feature vector can correspond to a particular aspect of 3D generated content such as a representation of a particular pattern or to the values of the pixels of an image.

SUMMARY OF THE INVENTION

Systems and methods in accordance with embodiments of the invention enable collaborative creation, transmission, sharing, non-linear exploration, and modification of animated video messages. One embodiment includes a video camera, a processor, a network interface, and storage containing an animated message application, and a 3D character model. In addition, the animated message application configures the processor to: capture a sequence of video frames using the video camera; detect a human face within a sequence of video frames; track changes in human facial expression of a human face detected within a sequence of video frames; map tracked changes in human facial expression to motion data, where the motion data is generated to animate the 3D character model; apply motion data to animate the 3D character model; render an animation of the 3D character model into a file as encoded video; and transmit the encoded video to a remote device via the network interface.

In a further embodiment, the 3D character model includes data describing: an articulated skeleton; at least one mesh; and skinning weights that determine the manner in which motion of the articulated skeleton deforms the at least one mesh.

In another embodiment, an articulated skeleton includes a plurality of bones configured to rotate in one or more degrees of freedom around joints, and a mesh is a plurality of vertices defining a surface comprising a plurality of polygons.

In a still further embodiment, the animation messaging application configures the processor to detect a human face within a sequence of video frames using a cascade of classifiers.

In still another embodiment, the storage contains a description of a space of human faces and facial expressions obtained using a training data set containing multiple images of human faces registered to a template image of a human face and multiple images of human facial expressions registered to the same template image of a human face, and the animation messaging application configures the processor to track changes in human facial expression of a human face detected within a sequence of video frames by configuring the processor to match the detected image of a human face to a point in the space of human faces and facial expressions using the description of a space of human faces and facial expressions.

In a yet further embodiment, the description of a space of human faces and facial expression is obtained by performing Principal Component Analysis (PCA) of a training data set containing multiple images of human faces registered to a template image of a human face and by performing PCA of multiple images of human facial expressions registered to the same template image of a human face to define a vector space of human faces and human facial expressions.

In yet another embodiment, the animation messaging application configures the processor to match a detected image of a human face to a point in the space of human faces and facial expressions using the description of a space of human faces and facial expressions by locating a vector within the space of human faces and human facial expressions that synthesizes an image of a human that is the closest match to the detected image of a human face in accordance with at least one matching criterion.

In a further embodiment again, the storage also contains a set of mappings from the space of human faces and facial expressions to a plurality of facial expressions for the 3D character model, where the plurality of facial expressions each represent a deformation of the mesh of the 3D character model, and the animation messaging application configures the processor to map tracked changes in human facial expression to motion data by configuring the processor to select a sequence of facial expressions for the 3D character based upon points in the space of human faces and facial expressions matching a detected image of a human face in a captured sequence of video frames and the set of mappings from the space of human faces and facial expressions to the plurality of facial expressions for the 3D character model.

In another embodiment again, the animation messaging application configures the processor to apply motion data to animate the 3D character model by configuring the processor to deform the mesh of the 3D character using a sequence of facial expressions for the 3D character model.

In a further additional embodiment, the animation messaging system further configures the processor to: detect an animation trigger; and animate the 3D character using additional motion data in response to the animation trigger.

In another additional embodiment, the animation messaging system further configures the processor to: detect an animation trigger; and animate object that shares a scene with the 3D character in response to the detection of an animation trigger.

In a still yet further embodiment, the animation messaging application further configures the processor to: receive a link from the remote location that identifies a location form which the encoded video can be retrieved; and send a message with the link to a second remote device.

In still yet another embodiment, the animation messaging application further configures the processor to: receive an interactive animated message comprising encoded video divided into a plurality of video sequences; select a video sequence from the plurality of video sequences; combine the selected video sequence with an additional video sequence to create a combined video sequence; and transmit the combined video sequence to a remote device via the network interface.

In a still further embodiment again, the animation messaging application further configures the processor to: receive an interactive animated message comprising encoded video divided into a plurality of video sequences; select at least one video sequence from the plurality of video sequences; and playback the selected at least one video sequence via a display device.

In still another embodiment again, a single device comprises the video camera, and processor.

A still further additional embodiment includes a video camera, a processor, a network interface, and storage containing an animated message application. In addition, the animated message application configures the processor to: capture a sequence of video frames using the video camera; detect a human face within a sequence of video frames; track changes in human facial expression of a human face detected within a sequence of video frames; map tracked changes in human facial expression to motion data, where the motion data is generated to animate the 3D character model; and transmit the motion data to a remote device via a network interface.

Still another additional embodiment also includes transmitting data identifying a 3D character model.

In a yet further embodiment again, the animation messaging application further configures the processor to: receive encoded video from the remote device via the network interface; detect an animation trigger; send additional motion data to the remote device via the network interface in response to the animation trigger; and receive updated encoded video from the remote device.

In yet another embodiment again, the animation messaging application further configures the processor to: receive encoded video from the remote device via the network interface; detect an animation trigger; send a message indicating the receipt of the animation trigger to the remote computing device; and receive updated encoded video from the remote device.

In a yet further additional embodiment, the animation messaging application further configures the processor to: receive an animated video message including motion data from a remote device, where the motion data comprises a plurality of animation sequences; select an animation sequence from the plurality of animation sequences; combine the motion data from the selected animation sequence with additional motion data to create combined motion data; and transmit the combined motion data to a remote device via a network interface.

In yet another additional embodiment, the animation messaging application further configures the processor to: receive an animated video message including motion data from a remote device, where the motion data comprises a plurality of animation sequences; select at least one animation sequence from the plurality of animation sequences; and render video using the selected at least one animation sequence.

In a further additional embodiment again, a single device comprises the video camera, and processor.

Another further embodiment includes a processor, a network interface, and storage containing an animated message application, and a 3D character model. In addition, the animated message application configures the processor to: receive a sequence of video frames from a remote device via a network interface; detect a human face within a sequence of video frames; track changes in human facial expression of a human face detected within a sequence of video frames; map tracked changes in human facial expression to motion data, where the motion data is generated to animate the 3D character model; apply motion data to animate the 3D character model; and render an animation of 3D character model into a file as encoded video.

In still another further embodiment, the animated message application configures the processor to transmit the encoded video to a remote device via a network interface.

Yet another further embodiment also includes a display; and a video decoder. In addition, the animated message application configures the processor to display the encoded video via the display and using the video decoder.

In another further embodiment again, the animated message application configures the processor to receive the 3D character model from a remote device via the network interface and store the 3D character in the storage.

In another further additional embodiment, the 3D character model is one of a plurality of 3D character models and the animated message application configures the processor to receive a selection of a 3D character model from the plurality of 3D character models from a remote device via the network interface, and is configured to apply the motion data to animate the selected 3D character model.

DETAILED DESCRIPTION

Figure 1:
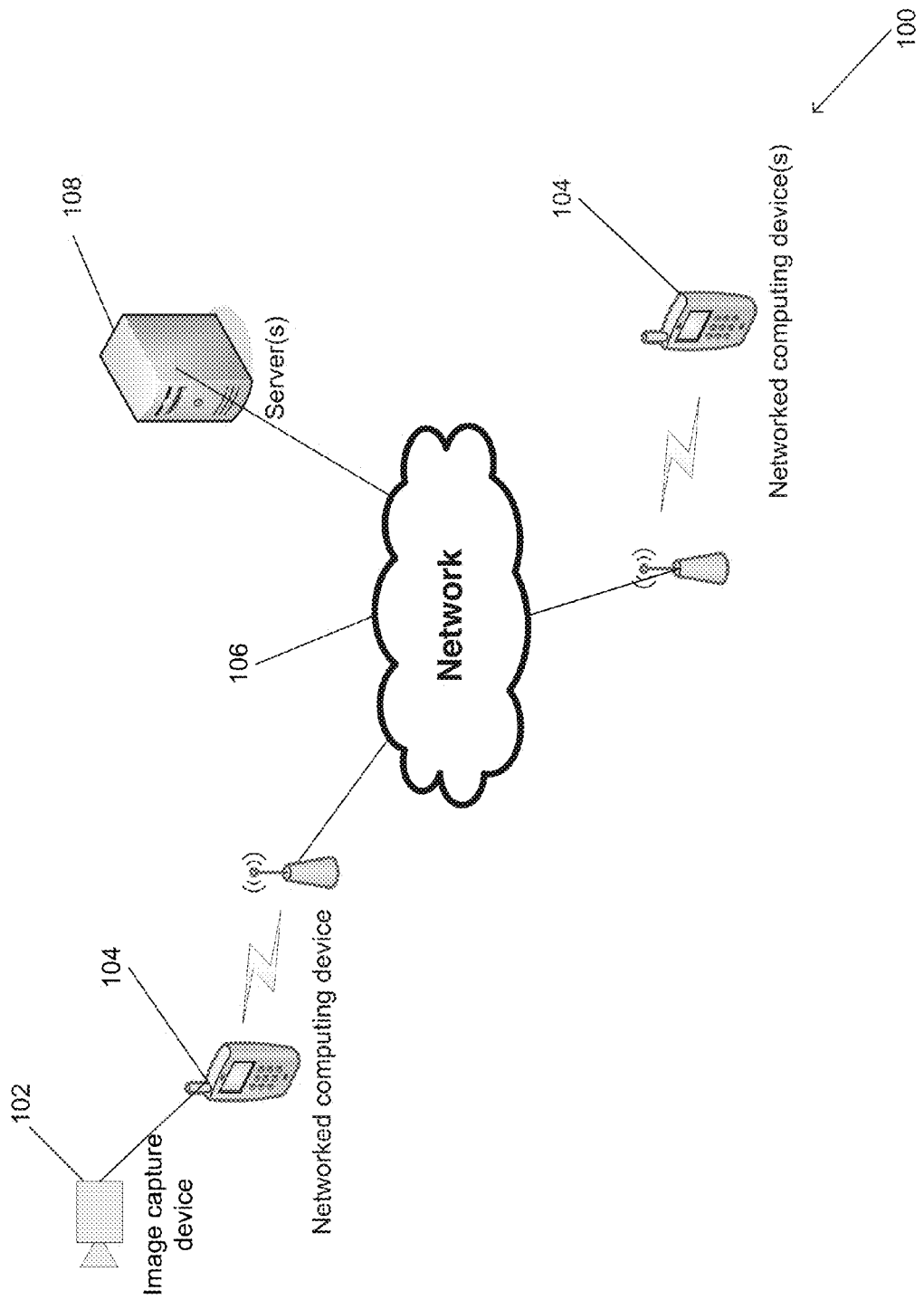
FIG. 1 illustrates a system for generating animated video messages in accordance with an embodiment of the invention.

Turning now to the drawings, systems and methods for creating, and distributing modifiable animated video messages in accordance with embodiments of the invention are illustrated. In many embodiments, animated video messages can be generated by tracking human facial expressions in captured video images and using the tracked expressions to drive animation of a facial model of a character. The animated facial model can then be used to render video for display. In this way, animated video messages can be created using video captured by a camera integrated within or connected to a first networked computing device and displayed on a second networked computing device. In a number of embodiments, additional animations can be applied to a character in accordance with one or more animation triggers.

In many embodiments, video rendered using an animated facial model is played back with an audio accompaniment recorded during the capture of the video used to animate the facial model. In certain embodiments, video rendered using an animated facial model of a character can be translucently overlaid in real time on the video of the human face used to drive the animation so that the composite video images of the human face and the animated character generate an effect similar to that of an animated mask or makeup overlaid on the human face.

In many embodiments, human facial expressions can be tracked by defining a space that encompasses the variability in human faces and facial expressions. In a number of embodiments, methods for dimensionality reduction such as (but not limited to) Principal Component Analysis (PCA), Independent Component Analysis, Canonical Correlation Analysis, and Fisher's Linear Discriminant can be utilized to describe the space of human faces and facial expressions. When a PCA space of human facial expressions is defined using a training data set, techniques including (but not limited to) a cascade of classifiers can be utilized to identify and extract a human face from a video image. A facial expression can be tracked by obtaining the feature vector of the human face and its expression within the PCA space of human facial expressions. The feature vector within the PCA space of human faces and facial expressions that is the closest match to the human face and facial expression can then be mapped to a facial model of a character. In a number of embodiments, the character includes a 2D or a 3D facial model and a PCA space of the 2D or 3D character's facial expression is defined. Therefore, a set of mappings can be defined that enable the mapping of feature vectors from the PCA space of human faces and facial expressions to the PCA space of the 2D or 3D character's facial expression. In this way, a sequence of images of a human face can be used to extract a sequence of feature vectors that are mapped to the PCA space of the 3D character's facial expression. This sequence of mappings animates the 2D or 3D facial model of the character and the animated facial model can be used to render video. Techniques for animating a facial model of a character using images of human facial expressions are discussed further in U.S. Provisional Application No. 61/674,292 filed Jul. 20, 2012, titled "SYSTEMS AND METHODS FOR ANIMATING THE FACES OF 3D CHARACTERS USING IMAGES OF HUMAN FACES", the disclosure of which is incorporated herein by reference in its entirety.

In many embodiments, the process of generating an animated message includes selecting a character from a library of multiple characters. In addition, a user can also select backdrops, props, text, and audio that can accompany the animation. Furthermore, a user can select camera movement, angle, orientation, zoom, and/or any other of a variety of parameters associated with rendering video from a 3D model of a scene. In several embodiments, the process of creating an animated message can be collaborative. One or more selections made by a first user can be changed by a second user to modify the rendered video. In addition, the second user can add additional animations, props, audio, text, and/or any other form of content to modify an animated message created by a first user.

In several embodiments, animated video messages can include additional animations applied to a character within an animated video message in accordance with an animation trigger. In certain embodiments, the detection of an animation trigger applies an additional animation using a technique including (but not limited to) concatenating the additional animation to an existing character animation, layering additional motion data indicative of the additional animation on top of existing motion data, and/or generating an animation that is associated with a character (such as but not limited to a sparking halo that appears on top of a character's head). The animation trigger can be any interaction with a networked computing device that can be detected and used to trigger the application of an additional animation to a character. Such triggers can include (but are not limited to) the detection of predetermined facial expressions or gestures using a camera, the detection of predetermined motions and/or interactions with the networked computing device using a motion sensor such as (but not limited to) an accelerometer, the detection of contact or touches using a touch screen, and/or the detection of predetermined sounds using a microphone. Particular animation triggers can cause predetermined animations to be applied to a character, such as (but not limited) applying a tickling animation to a character in response to detection of a predetermined sequence of touches via a touch screen, and/or applying a shaking animation to a character in response to detection of a shaking motion using an accelerometer. Techniques for blending multiple animations for application to 3D characters are discussed further in U.S. patent application Ser. No. 13/097,031 filed Aug. 28, 2011, titled "REAL-TIME AUTOMATIC CONCATENATION OF 3D ANIMATION SEQUENCES", the disclosure of which is incorporated herein by reference in its entirety.

In various embodiments, animated video messages can be distributed over a network as content stored on servers accessible via a URL. In certain embodiments, animated video messages are distributed using the Wireless Application Protocol (WAP) for store-and-forward services such as the Multimedia Messaging Service (MMS) on networked computing devices.

In many embodiments, various processes that are utilized in the generation of an animated video message are performed by devices distributed across a network. These devices can include networked computing device that can include a video camera (such as but not limited to a personal computer, tablet computer, or a mobile phone), and/or network connected servers. These devices can perform any of a variety of functions related to the generation of an animated video message, such as (but not limited to) tracking changes in human facial expressions from captured video images, detecting animation triggers, generating character animations from the tracked human facial expressions and/or detected triggers, rendering character animations, displaying rendered character animations, and encoding the rendered character animations in a video. In addition, the devices can enable the collaborative creation of animated messages by permitting a first user to create an initial animated message that can be modified by a second device to produce a second animated message. Devices can be utilized for the performance of a specific function or generally utilized for a variety of functions related to the generation of animated video messages, such as (but not limited to) processing data from captured video images or displaying rendered character animations. Each device can perform all or only some of the functions related to the generation of animated video messages.

In a number of embodiments, the process of creating animated video messages is collaborative. In a number of embodiments the animated video message is created through a linear or a non-linear story where the animated video story blocks are pieced together by different users. The users can either choose pre-existing animated story blocks or they can create new ones. Animated video messages can be distributed between different users and animation sequences, and/or video clips within an animated video message can be further reused, augmented or expanded to create additional animated video messages. In this way, various animation sequences can be seeded into the social graph and can become building blocks for the creation of an increasing array of content. In a number of embodiments, the animated video messages that are distributed are interactive and users can determine the order in which animation sequences and/or video clips are played back. The additional content contained within interactive animated video messages (irrespective of whether used in playback of an animated video message by a specific user) can also be reused to create additional animated video messages. In one embodiment of the invention some story blocks of the animated video are pre-set and some others can be defined or customized by the user. Systems and methods for generating animated video messages, distributing animated video messages, interacting with animated video messages and reusing, or expanding animation sequences and/or video clips contained within animated video messages to create additional animated video messages in accordance with embodiments of the invention are discussed further below.

Systems for Generating Animated Video Messages

A processor configured via an appropriate software application can generate animated video messages using video images captured by a video camera and/or any of a variety of other sources of input including (but not limited to) sensors, touch screens, and/or microphones. Processors resident upon a networked computing device or a server connected to a network can perform a variety of functions related to generation of animated video messages, including (but not limited) to detecting changes in human facial expressions, detecting animation triggers, generating character facial animations from detected changes in human facial expressions, applying character animations upon recognizing an animation trigger and rendering character animations. Processors resident upon a networked computing device or server can also format data for transmission in a variety of formats, including the Wireless Application Protocol (WAP) for store-and-forward services such as the Multimedia Messaging Service (MMS) on networked computing devices or as content stored on servers accessible over a network via a URL.

In various embodiments, networked computing devices can send animated video messages to other networked computing devices over a network. These animated video messages can be generated by a networked computing device and sent to another networked computing device directly. Animated video messages can be sent directly utilizing any method, including (but not limited to) by streaming a rendered character facial animation to another networked computing device, sending tracked human facial expression data that enables a networked computing device to generate, render and display a character facial animation, or by sending character facial animation data to a networked computing device that enables a networked computing device to render and display a character facial animation. In certain embodiments, animated video messages include animations applied to a character according to recognition of an animation trigger and a networked computing device can generate motion data in response to the trigger locally and/or provide the animation trigger or a description of an animation to a networked computing device to generate appropriate motion data. Streaming can be accomplished by sending individual component packets of data from a rendered animated video message in a specific order where the packets of data are buffered by the networked computing device that receives the stream and plays back the animated video message in real time. Animated video messages can also be sent indirectly utilizing any method, including (but not limited to) generating, rendered, and/or storing a character animation, including character facial animation, on a server accessible to a networked computing device.

A system for generating animated video messages in accordance with an embodiment of the invention is illustrated in FIG. 1. Image capture devices 102 capable of capturing video images that include a human face can be connected or integrated with a networked computing device 104. Each networked computing device 104 can be connected via a network 106, such as (but not limited to) the Internet, to one or more servers 108 that can facilitate communication amongst networked computing devices or provide services related to generating animated video messages. Thereby, recipient networked computing devices 104 can receive animated video messages generated from the video images captured by the image capture device 102 over the network 106.

In many embodiments, the generation of an animated video message can take place on the networked computing device 104 that captured the video of a human face or across various devices, such as across a combination of networked computing devices 104 and servers 108. In certain embodiments, a networked computing device 104 can receive a selection of a 3D character via a user interface, capture video images using an image capture device 102 such as (but not limited to) a video camera, detect the changes in human facial expressions in the captured video images, recognize an animation trigger, generate character animation from tracking the changes in the human facial expressions or from applying motion data to a character based upon the recognition of an animation trigger, receive instructions concerning backdrops, text, audio, camera movement, angle, orientation, and/or zoom, render the character animation and send the rendered character animation to another networked computing device 104 over the network 106. In several embodiments, a server 108 can render the character animation from a character animation generated on a networked computing device 104. In many embodiments, a server 108 can generate and render character animation from changes detected in human facial expressions captured by a video camera or from motion data applied to a 3D character in accordance with a recognized animation trigger using a networked computing device. In a number of embodiments, a server 108 can detect changes in human facial expressions from video captured by a networked computing device 104, generate a character animation and/or render video from the character animation. In several embodiments, a first networked computing device captures video images, a server detects changes in human facial expressions from captured video images, and a second networked computing device generates animation using the changes in human facial expression detected by the server and/or from animation applied to a 3D character in accordance with a recognized animation trigger and renders the animation for display. In particular embodiments, a first networked computing device captures video of human facial expression and/or detects one or more animation triggers. A second networked computing device can receive the captured video, detect changes in human facial expressions or recognize an animation trigger, generate a character facial animation from the tracked changes or other character animation in accordance with the animation trigger, and/or render the character animation. In a number of embodiments, the second networked computing device can change a variety of aspects of the animation including (but not limited) modifying the 3D character selection, modifying backdrops, props, text, audio, camera movement, angle, orientation, zoom, and/or any other characteristic of the animation that was controllable during the initial generation of the animation. In several embodiments, the networked computing device that creates or modifies an animation can control the extent to which collaborators can control aspects of the animation. Although specific distributions of processes across various devices are discussed above, as can be readily appreciated various processes involved in the generation of animated video messages can be performed by any of a variety of networked computing devices and servers during the distribution of animated video messages in accordance with embodiments of the invention.

Although specific systems for generating and distributing animated video messages are discussed above, animated video messages can be transmitted over a variety of systems using a variety of techniques as appropriate to the requirements of specific applications in accordance with embodiments of the invention. Processes for generating animated video messages using MMS are discussed below.

Animated Video Messages Transmitted Over the Multimedia Messaging Service

Figure 2:
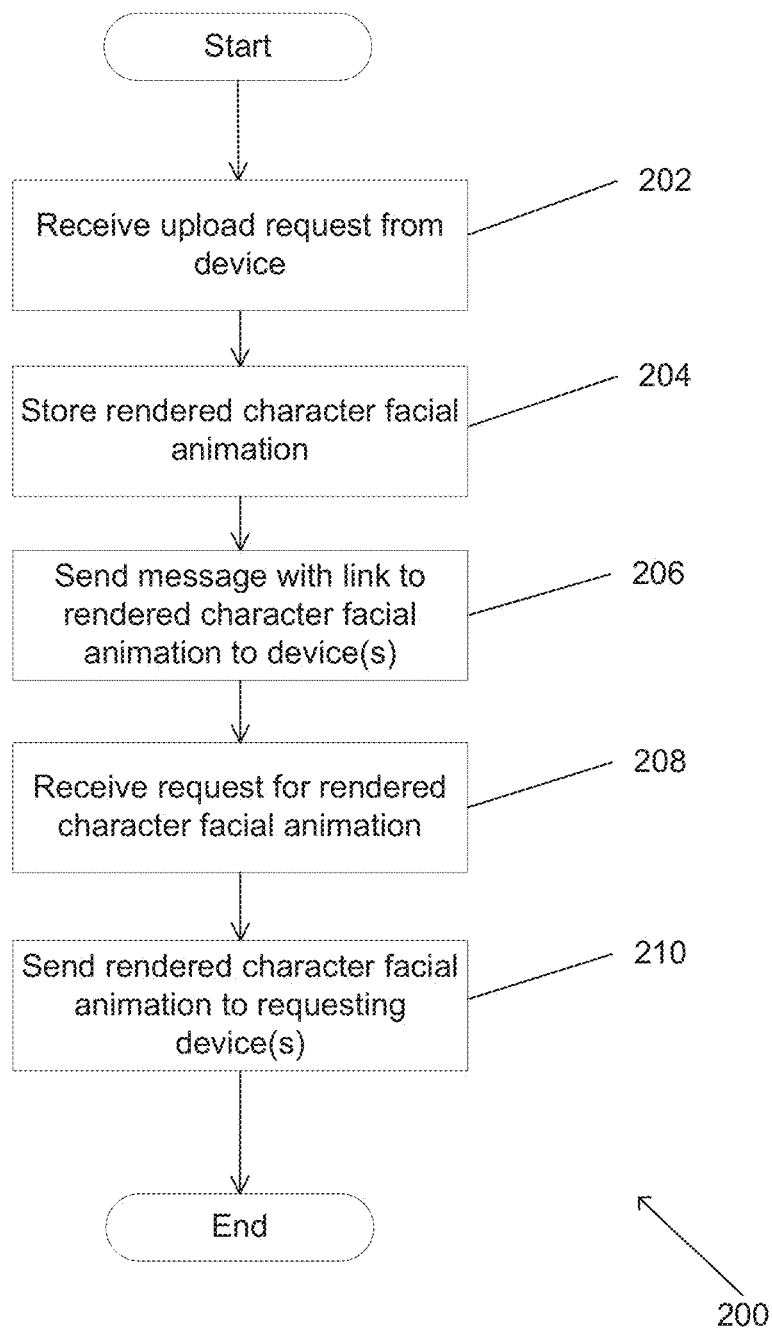
FIG. 2 is a flow chart illustrating a process for sending animated video messages in accordance with an embodiment of the invention.

In many embodiments, networked computing devices can be connected to a cellular data network that can transfer multimedia files via MMS. A process for sending an animated video message over MMS using a server in accordance with an embodiment of the invention is illustrated in FIG. 2. The process 200 includes receiving (202) an upload request to upload a rendered character facial animation on a server from a networked computing device that utilizes an HTTP post API. The server can be a Multimedia Messaging Service Center (MMSC) server that receives the request as an MMS message encoded in the MMS encapsulation format, defined by the Open Mobile Alliance standard. The encoded MMS message can include the rendered character animation as well as header information including a list of the networked computing devices that are the intended recipients of the message. The server can validate the networked computing device that sent the MMS message, store (204) the content of the MMS message and make the content of the MMS message available via a dynamically generated URL. The server can then generate an MMS notification message, which is sent (206) via a WAP push API over a Short Message Service (SMS) to the networked computing devices that are the intended recipients of the message. The MMS notification message can contain a URL pointer to the MMS content. The server can then receive (208) the request for the rendered character animation from an HTTP get API using the URL pointer and the server can send (210) the rendered character animation to the requesting networked computing device(s).

Although specific systems for transmitting animated video messages using MMS are discussed above, animated video messages can be transmitted using a variety of techniques as appropriate to the requirements of specific applications in accordance with embodiments of the invention. Processes for generating animated video messages are discussed below.

Generating Animated Video Messages

Animated video messages in accordance with many embodiment of the invention can be generated and transmitted across a system of networked computing devices and servers. Across this network, a variety of configurations of a networked computing device and one or more servers can be utilized to generate an animated video message for display of a rendered character animation based upon interactions with the networked computing device on another networked computing device. Processes that can be performed during the generation and display of animated video messages by a networked computing device that captures video images of a human face and/or animation triggers, and/or a combination of a networked computing device that captures video images of a human face and/or animation triggers, one or more servers, and a networked computing device that displays an animated video message in accordance with embodiments of the invention are discussed further below.

Figure 3:
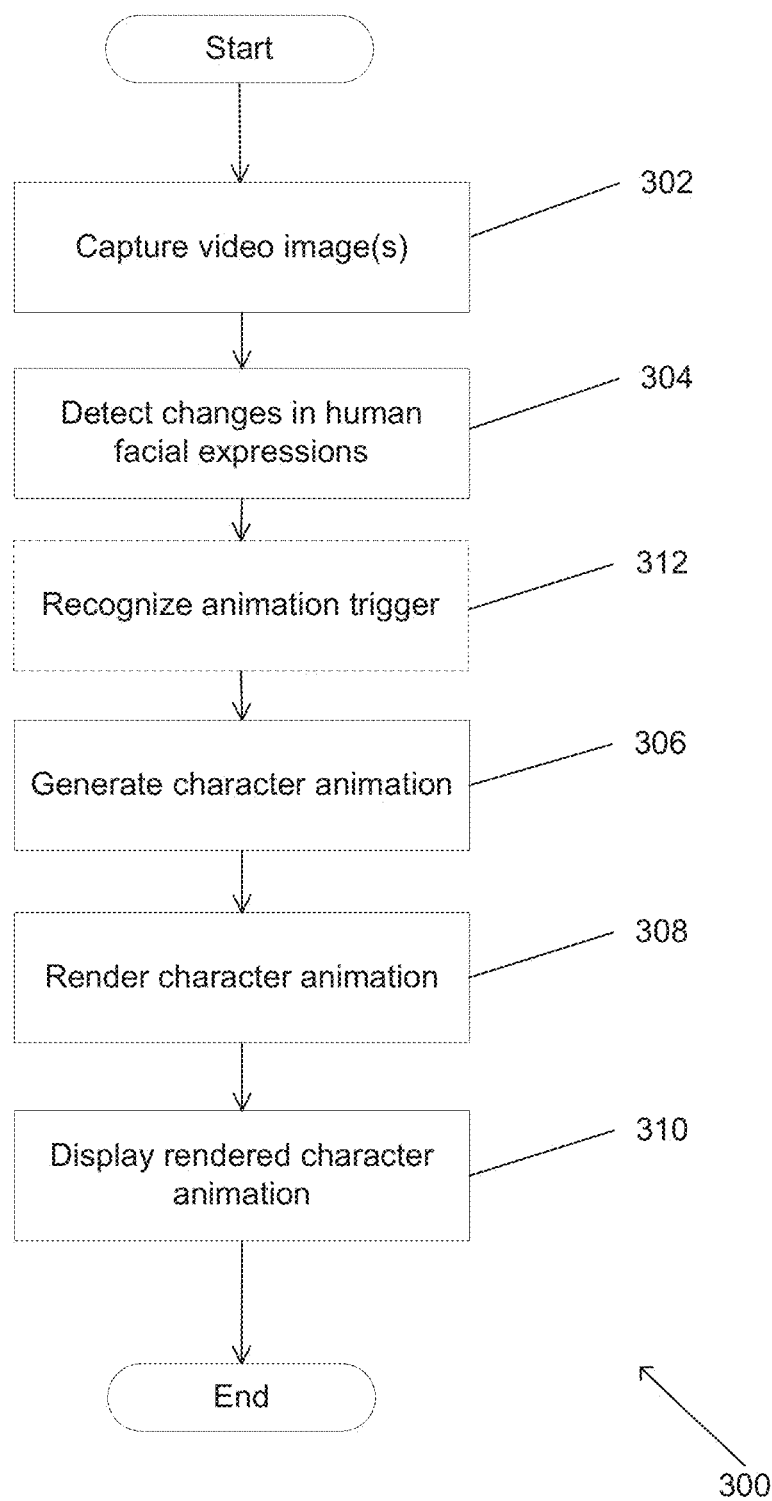
FIG. 3 is a flow chart illustrating a process of generating animated video messages in accordance with an embodiment of the invention.

A flow chart illustrating a process of generating animated video messages in accordance with an embodiment of the invention is illustrated in FIG. 3. The process 300 includes capturing (302) video images and/or sensor data indicative of animation triggers. In many embodiments various video images can be captured (302) by a video camera. This video camera can be integrated with or otherwise connected with a networked computing device, such as (but not limited to) a mobile phone, tablet computer or personal computer that can include sensors such as accelerometers, touch screens and/or microphones that can be utilized to capture data to detect animation triggers. From the video images, changes in human facial expressions indicative of human facial animation from a human face captured within the video images can be detected (304). Various different methods of tracking the changes within a human face can be utilized including (but not limited to) tracking landmark points, edges, colors or any aspect of video images from which changes in human facial expressions can be tracked. Optionally, animation triggers can also be recognized (312) that trigger the application of particular behavior or animations to a character in accordance with the particular animation trigger recognized. Character animation can be generated (306) from the tracked changes in human facial expressions as well as motion data applied to the character based upon recognition of an animation trigger. In certain embodiments, character facial animation is generated based upon animating a character with motion data generated using mappings of data tracking changes in human facial expressions across video images. In certain embodiments, character facial animation is generated by mapping changes in a feature vector in a PCA space of human faces and facial expressions derived from the images of human facial expressions to a feature vector in a PCA space for the facial expressions of a 3D character. In other embodiments, any of a variety of techniques can be utilized to track human facial expressions and to map the tracked facial expressions to a facial model of a character. The animation of the character can be rendered (308) into a file as encoded 2D (or 3D) video and decoded for display (310).

Although specific processes for generating animated video messages are discussed above, animated video messages can be generated from a variety of processes as appropriate to the requirements of specific applications in accordance with embodiments of the invention. Processes for tracking changes in human facial expressions that can be utilized in generating character facial animations in accordance with embodiments of the invention are discussed below.

Tracking Changes in Video Images of a Human Face

In certain embodiments, a human facial expression is identified from a region of a video image identified as representing a human face. In certain embodiments, a human face can be manually identified by a user, such as by a user manually outlining a face in a region of a video image or placing the face in a predetermined location within a video image (e.g. using a template overlaid on a displayed video image). In several embodiments, a cascade of classifiers operating on an image is utilized to detect a human face from within a video image. Various different human face detection methods are discussed in P. Viola, M. Jones, *Robust Real-time Object Detection*, IJCV 2001, the disclosure of which is hereby incorporated by reference in its entirety. Facial detection methodologies can be enhanced by capturing or processing video images to be more useful. In several embodiments, a conventional RGB video camera can be used to capture video images and each raw video image can undergo image enhancement steps such as, but not limited to, gamma correction, histogram equalization, and shadow recovery. In other embodiments, any of a variety of image enhancement processes that enhance the overall quality of the input image and increase the robustness of subsequent facial expression detection processes within a variable range of lighting conditions and video capture hardware can be utilized.

In several embodiments, the process of detecting and tracking human facial expressions involves determining the feature vector from a PCA space of human faces and facial expressions that most closely matches the human face detected within a video image. In certain embodiments, the feature vector changes in a PCA space of human faces and facial expressions is found by determining the feature vector changes in the PCA space of human faces and facial expressions closest to detected changes in human facial expressions. A description of the space of human facial faces and facial expressions can be found by performing PCA with respect to a training set of human faces and facial expressions that are registered with respect to a template. In many embodiments, a training set can include a set of 2D images or 3D images, where the 3D images can include additional metadata including (but not limited to) depth maps. The 3D images contain more information concerning the geometry of the faces in the training dataset. Therefore, defining a PCA space of human faces and facial expressions using 3D geometry information and texture information can be more challenging. Depending upon the training data, the PCA can construct a description of the space of human faces and facial expressions in 2D and/or in 3D. In addition, the training data for human facial expressions can include images of human facial expressions at slight angles relative to the camera and/or images with different light conditions to increase the robustness of the detection of a human facial expression, when a human performer is not looking directly at the camera or when the light conditions vary.

The tracking of human facial expressions can then be determined by tracking the feature vector from the PCA space of human faces and facial expressions that best matches the human facial expressions of the detected human face in the video sequence. The space of human faces and human facial expressions can be learned by separating the geometry and texture components of human faces. In many embodiments, the feature vector is a combination of a descriptor of the geometric component of the face (i.e. a vector of a chosen size of coefficients describing facial geometry, for example, as the sum of facial geometry eigenvectors) and a descriptor of a texture component of the face (i.e. a vector of a chosen size of coefficients describing the subject facial texture, for example, as a sum of facial eigenvectors). The feature vector that is the best match can be found by scaling and positioning the face extracted from the captured image with respect to a template and then finding the geometric and texture components of the feature vector within a PCA space of human faces and facial expressions that most closely corresponds to the scaled face.

Figure 4:
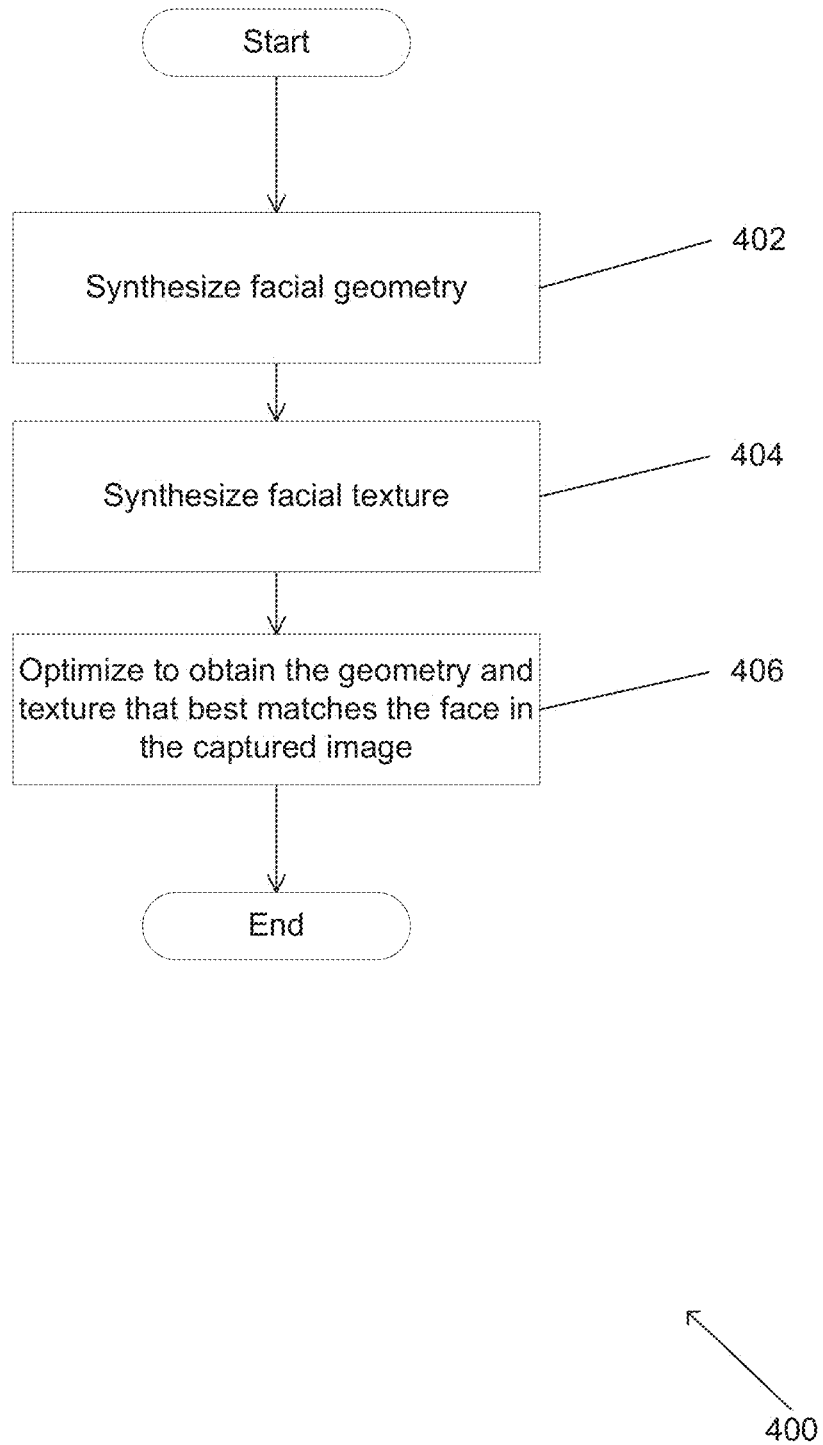
FIG. 4 is a flow chart illustrating a process for detecting changes in human facial expressions in accordance with an embodiment of the invention.

A process for determining the feature vector that most closely matches a human face in accordance with an embodiment of the invention is illustrated in FIG. 4. The process 400 includes synthesizing (402) a facial geometry from an estimate of face position/size and geometry within a captured video image. A facial texture is then synthesized (404) on a defined reference facial geometry using an estimate of the facial texture based upon the captured image. Optimization (406) of the synthesized geometries and textures can then be performed based upon any of a variety of matching criteria to obtain the geometry and texture that best matches the face in the captured image. In several embodiments, a similarity function (to maximize criteria indicating similarity) or a distance function (to minimize criteria not indicating similarity) are optimized to obtain the geometry and texture that is the best match. Depending upon whether the captured image includes 2D or 3D information, an appropriate 2D or 3D template can be utilized to determine facial geometry.

In various embodiments, a human face can be detected and changes tracked through the tracking of landmark points of a face, indicative of human facial expressions, detected within a video image. The changes detected within the human face can then be modeled as the change or movement of these landmark points across video images. Landmark points can be determined manually or through utilization of a process to generate more accurate landmark points, such as but not limited to Active Appearance Models (AAM). Various techniques for utilizing AAM are discussed in T. F. Cootes, G. J. Edwards, C. J. Taylor, *Active appearance models*, ECCV 1998, the disclosure of which is hereby incorporated by reference in its entirety. In certain embodiments, human facial expressions can be tracked based upon the parameterization of face shape, expression and orientation by using 3 sets of parameters: (1) scale and position of the face in the input video image; (2) a descriptor of the geometric component (a vector of a chosen size of coefficients describing the subject face geometry, for example, as a sum of facial geometry eigenvectors); and (3) a descriptor of the texture component (a vector of a chosen size of coefficients describing the subject facial texture, for example, as a sum of facial texture eigenvectors). In other embodiments, any of a variety of sets of parameters can be utilized to parameterize and track changes in human facial shape, expression and orientation in accordance with embodiments of the invention.

Although specific processes for detecting changes in human facial expressions that can be used to generate character facial animation are discussed above, changes in human facial expressions can be detected utilizing any of a variety of processes that are appropriate to the requirements of a specific application in accordance with embodiments of the invention. Processes for generating character facial animation in accordance with embodiments of the invention are discussed below.

Generating Character Facial Animation

Figure 5:
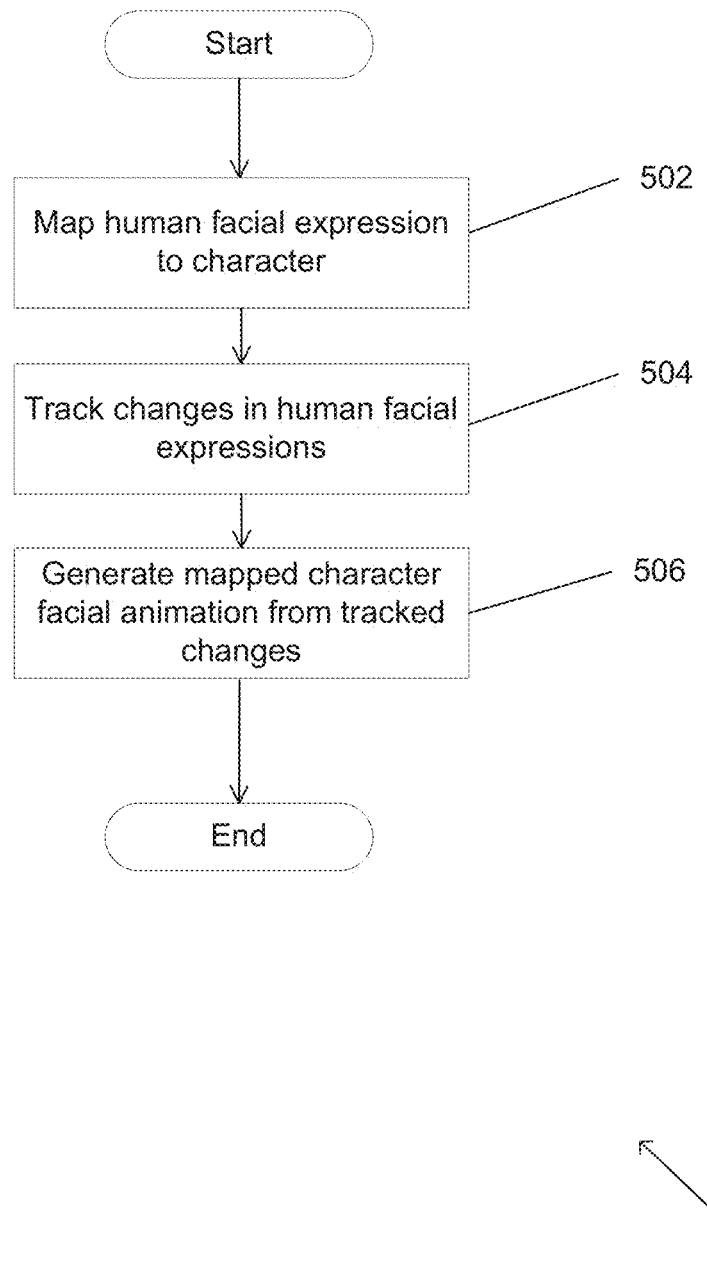
FIG. 5 is a flow chart illustrating a process for tracking changes across human facial expressions in accordance with an embodiment of the invention.

Character facial animation in accordance with many embodiments of the invention can be generated by mapping a character's facial animation from detected changes in human facial expressions. This mapping determines a relationship (which can be but is not limited to a scaled relationship) between the facial expressions of a human face and the facial expressions of a character. The change of a human face's facial expression over various video images can drive a character facial animation. A process for generating a character facial animation from tracked changes in human facial expressions in accordance with an embodiment of the invention is illustrated in FIG. 5. The process 500 includes mapping (502) human facial expressions to the facial model of a character. After mapping, changes in human facial expressions can be tracked (504) and used to generate (506) character facial animation in accordance with the mappings.

Figure 6:
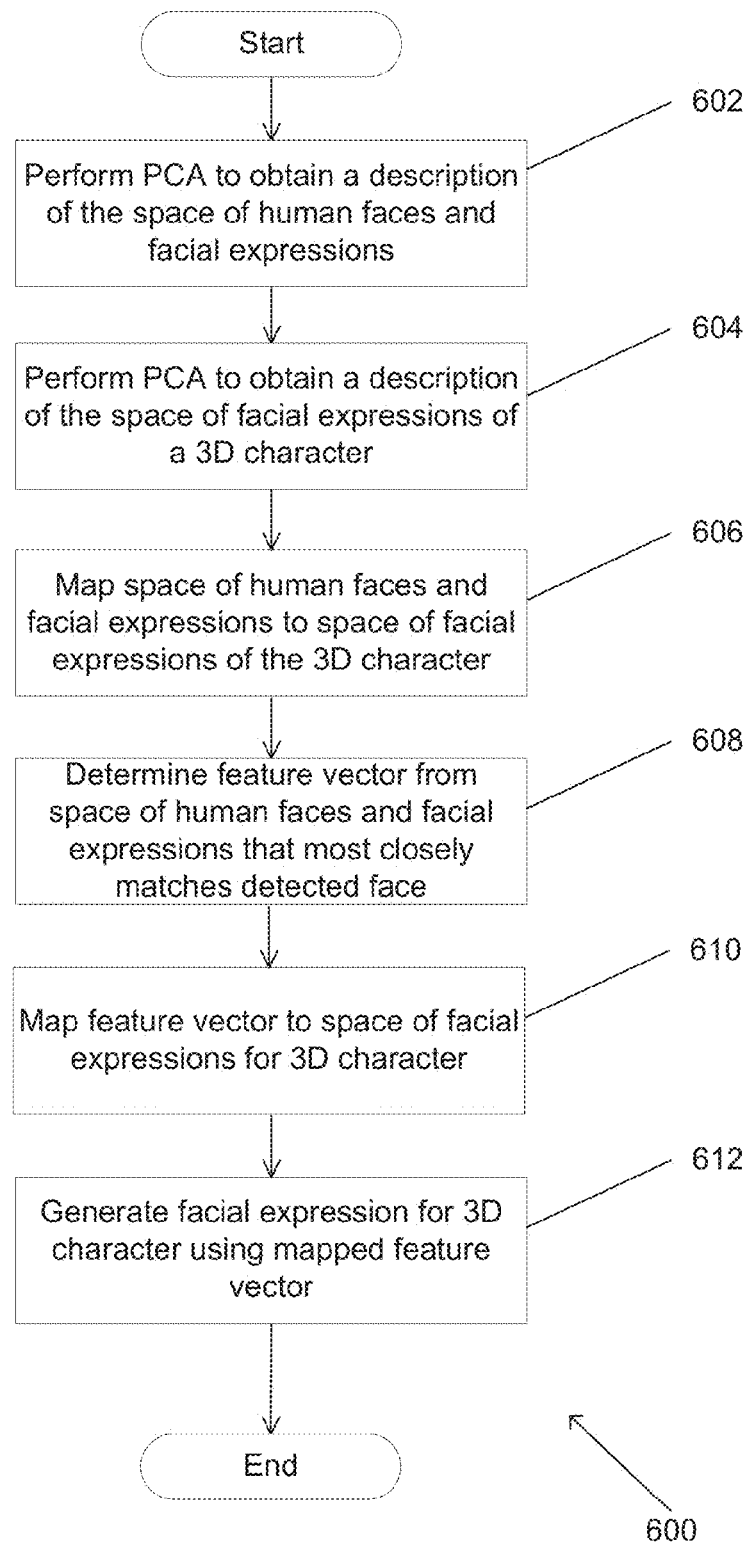
FIG. 6 is a flow chart illustrating a process for generating character facial animation utilizing a mapped feature vector in accordance with an embodiment of the invention.

A flow chart illustrating a process of generating a facial expression for a 3D character in accordance with an embodiment of the invention is illustrated in FIG. 6. The process 600 includes performing (602) PCA to obtain a description of the space of human faces and facial expressions. The process 600 also includes performing (604) PCA to obtain a description of the space of facial expressions of a 3D character. As an alternative to generating a description of the space of facial expressions of a 3D character, a discrete set of facial expressions can be utilized, the feature vector can be projected into the facial expression controls (such as but not limited to blend shapes controllers) of the 3D character, or a template used in the definition of the PCA space of human faces and facial expressions can be applied to the 3D character face and the feature vector applied directly to the template. After performing PCA to obtain a description of the relevant spaces, a set of mappings is defined that maps (606) the space of human facial expressions to the space of facial expressions of the 3D character. Mappings can include linear, non-linear or a combination of linear and non-linear mappings. After the mappings are generated, the feature vector from the space of human faces and facial expressions that most closely matches a detected face is determined (608). The most closely matching feature vector can then be mapped (610) to a facial expression for the 3D character using the mappings to generate (612) the face of a 3D character including a corresponding facial expression to the human facial expression captured in the image. In the illustrated embodiment, the mapping is between PCA spaces although alternative mappings can also be utilized as appropriate to the requirements of specific applications in accordance with embodiments of the invention.

Although specific processes for generating character facial animations are discussed above, processes that generate character facial animation can be implemented in a variety of ways that are appropriate to the requirements of a specific application in accordance with embodiments of the invention. Application of additional animations to characters in response to detection of animation triggers in accordance with embodiments of the invention is discussed further below.

Application of Animations from Animation Triggers

Animated video messages, in accordance with many embodiments of the invention, can include a character with additional animation applied based upon the recognition of an animation trigger. In certain embodiments, the recognition of an animation trigger applies an additional animation by concatenating the additional animation to existing motion data, layering additional motion data indicative of the additional animation on top of existing motion data, and/or generating an animation that is associated with a character (such as but not limited to a sparking halo that appears on top of a character's head). As discussed above, an animation trigger can be any interaction with a networked computing device that is capable of being recognized by the networked computing device.

In several embodiments, animation triggers are based on the recognition of a particular type of interaction with a networked computing device. The interaction can be physical interaction from a user as detected utilizing sensors such as an image capture device, accelerometers, GPS and/or a touch-screen. These physical interactions include any type of physical interaction with a networked computing device such as (but not limited to) physical motions or facial expressions detected by an image capture device, touch user interface (UI) interactions detected on a touchscreen, or motion based interactions such as shaking a networked computer device detected using an accelerometer. The facial expressions can be any facial expressions that can be detected such as a smile or a frown which triggers an additional animation to be applied to a character (such as but not limited to an animation trigger that triggers the overlay of a sparking star animation on a character's tooth). In certain embodiments, the interactions can also be utilized to customize an additional animation applied to a character such as a finger press on a touchscreen used as direct inverse kinematic (IK) effectors applied to a character (such as but not limited to where a user pins the right hand of a character with a finger press while the character is performing some animation that freezes the animation of the character's right hand). In several embodiments, the interactions can also be audio interactions as detected utilizing a microphone. These audio interactions can include semantic interaction, such as the detection of particular spoken words.

In several embodiments, physical actions such as gestures performed by a user of a networked computing device can be recognized using machine learning as an animation trigger. These physical actions can include certain physical motions or facial expressions detected by an image capture device or touch user interface (UI) interaction on a touch-screen. Machine learning techniques, such as support vector machines, can be utilized to recognize particular gestures (such as but not limited to a particular type of hand wave or sequence of touch inputs on a touch-screen). Support vector machines are a non-probabilistic binary linear classifier utilized to recognize patterns in the classification of data from a set of training data marked as belonging to particular categories to build a model that assigns new data into categories learned from the training data.

In numerous embodiments, an animation trigger can cause an additional animation to be applied to a character as motion data indicative of the additional animation. The motion data can be blended with other motion data to affect the animation of a character in real time. Furthermore, multiple animation triggers can simultaneously trigger the application of motion data indicative of a number of additional animations that can be blended together to animate a character.

In many embodiments, an animation trigger can cause an additional animation to be concatenated to an existing character animation to generate a new sequence of animations. An additional animation can be concatenated by generating a transition between a motion and the additional motion by modifying and/or adding additional motion data to generate a smooth animation sequence. In certain embodiments, the transition between the two sets of motion data can be iteratively refined until an acceptable transition is obtained. Various techniques for concatenating and blending character animation are discussed further in U.S. patent application Ser. No. 13/097,031 filed Aug. 28, 2011, titled "REAL-TIME AUTOMATIC CONCATENATION OF 3D ANIMATION SEQUENCES", the disclosure of which is incorporated herein by reference in its entirety.

Figure 7:
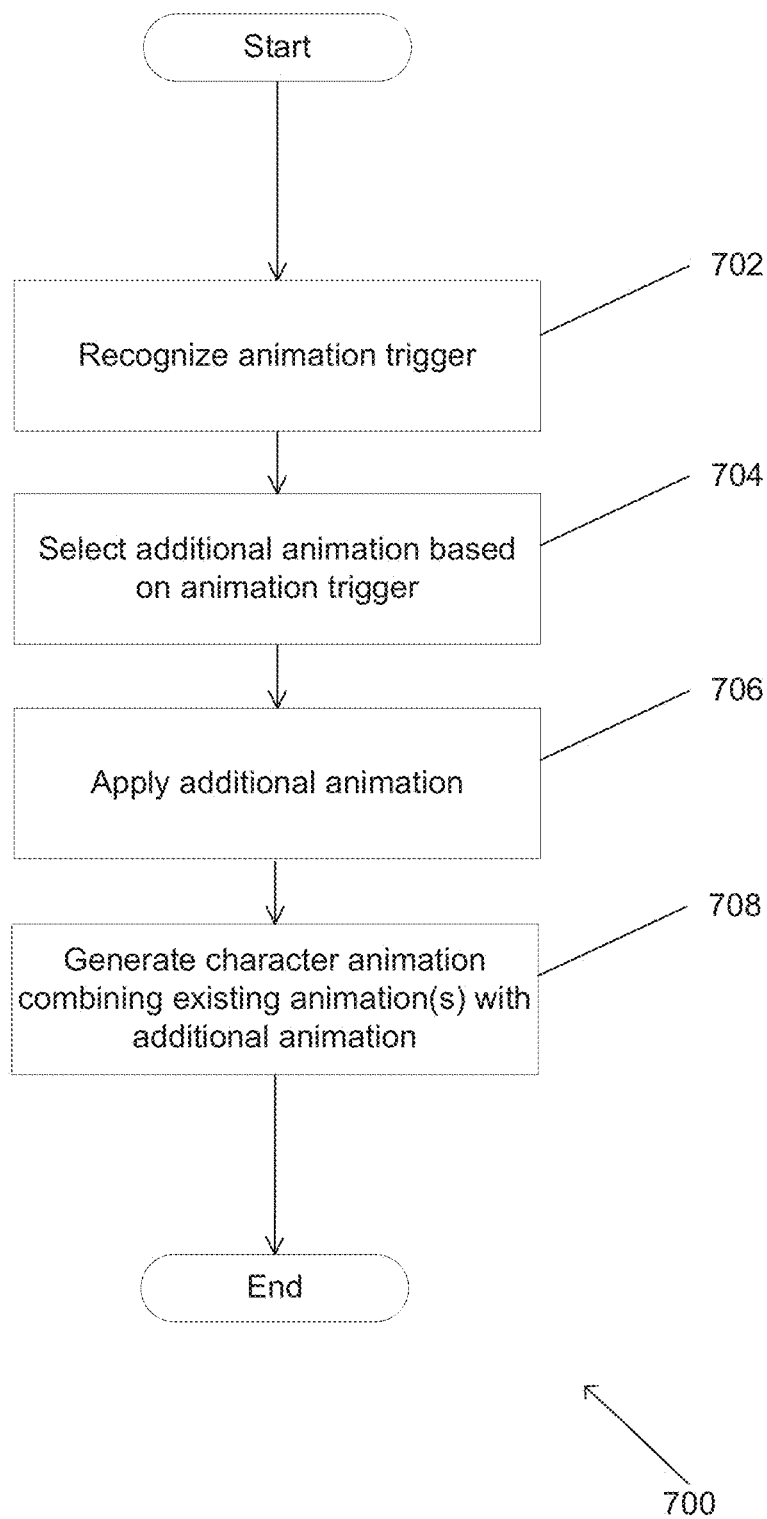
FIG. 7 is a flow chart illustrating the application of animations to an animated video message from an animation trigger in accordance with an embodiment of the invention.

A flow chart illustrating the application of animations to an animated video message in accordance with an embodiment of the invention is illustrated in FIG. 7. The process 700 includes recognizing (702) an animation trigger. An additional animation can be selected (704) based upon the recognized animation trigger. The additional animation can then be applied (706) to a character to generate (708) character animation with the additional animation.

In many embodiments, the animations are combined with the assistance of similarity maps that identify pose similarity between the two sets of motion data. In several embodiments, the similarity map can be weighted to prioritize similarity between key components of a character. The similarity map can be utilized to generate a combined animation using combination processes including but not limited to a combination of motion blending; linear or non-linear time warping; physics considerations such as conservation of momentum or speed; pose matching elements such as matching of the pivot node position and or orientation; and inverse kinematic constraints. Generating a combined animation can start with the spatial registration and time-warping of the first and additional motions using defined parameters, such as using a foot or the hips as a registration point. Then blending between the frames of the first motion and frames of the additional motion can be computed. Further corrections and/or improvements can be applied to the blended motion, including but not limited to time-warping correction, smoothness enforcement, and corrections accounting for conservation of momentum or speed. A number of controls can be open to user's interaction for fine tuning of the motions for 3D character animation.

Although specific processes for applying additional animations and combining motion data of multiple animations are discussed above, processes for generating character animation and for generating animated video messages can be implemented in a variety of ways that are appropriate to the requirements of specific applications in accordance with embodiments of the invention. Rendering and display of animated video messages are discussed further below.

Rendering and Display of Animated Video Messages

Animated video messages in accordance with many embodiments of the invention can be rendered using an animation of a character and the rendered video displayed on a networked computing device. The term rendering is typically used to describe calculations performed by a processor to translate a mathematical description of a scene into 2D video image data. During the rendering process, all the data related to a scene including (but not limited to) spatial, textural and lighting information is combined to determine the values of each pixel within a flattened image. Animated video messages can be rendered as video image data that can be displayed on a networked computing device and/or encoded for storage, transmission and/or decoding on another networked computing device. Video image data can be generated from a scene file that includes information that represents a character's animation in virtual space with additional details such as (but not limited to) geometry, backdrop, props, viewpoint, texture, lighting and shading information from which scenes in their entirety (which include character facial animation) can be represented. In certain embodiments, rendering generates a scene that includes an effect where character animation is overlaid over other video images such as (but not limited to) the images of a human face utilized to drive the animation of the facial model. In many embodiments, a scene file can be shared between different networked computing devices and the users of the networked computing devices can collaboratively modify the contents of the scene.

In several embodiments, animated content is transferred as metadata from one networked computing device to another networked computing device. A software application can be installed in both networked computing devices that enable transmission of a full 3D scene as opposed to 2D rendered video or a rendered multiview stereo pair of video streams. The recipient networked computing device can thus experience the animated message in a 3D scene and facilitate interactions with content, such as (but not limited to) by controlling the 3D scene camera position and/or orientation.

In a number of embodiments, the software application can enable the addition of further animations and/or the forwarding of the animated message to other networked computing devices.

Figure 8A:
FIG. 8A is a screen shot illustrating a pose of a surprised human facial expression mirrored by a frame of character facial animation in accordance with an embodiment of the invention.
Figure 8B:
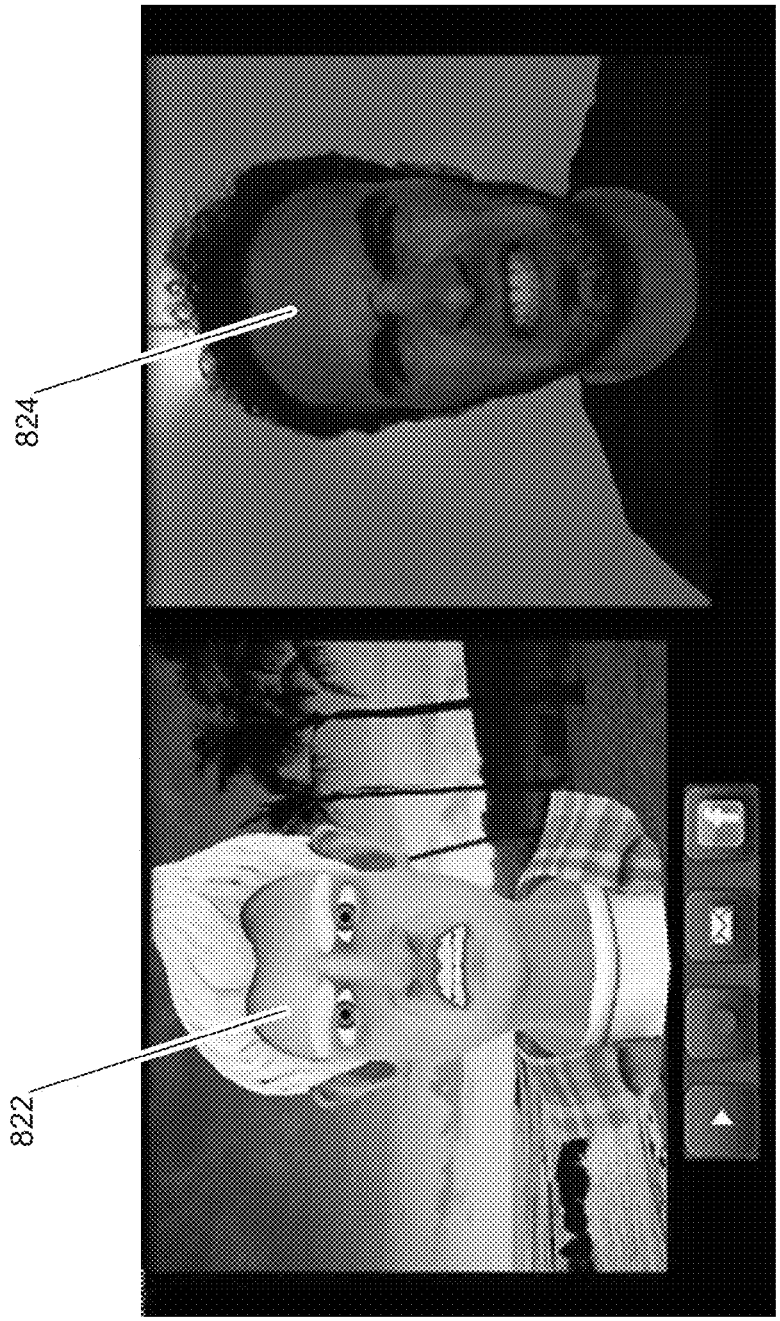
FIG. 8B is a screen shot illustrating a pose of an angry human facial expression mirrored by a frame of character facial animation in accordance with an embodiment of the invention.
Figure 8C:
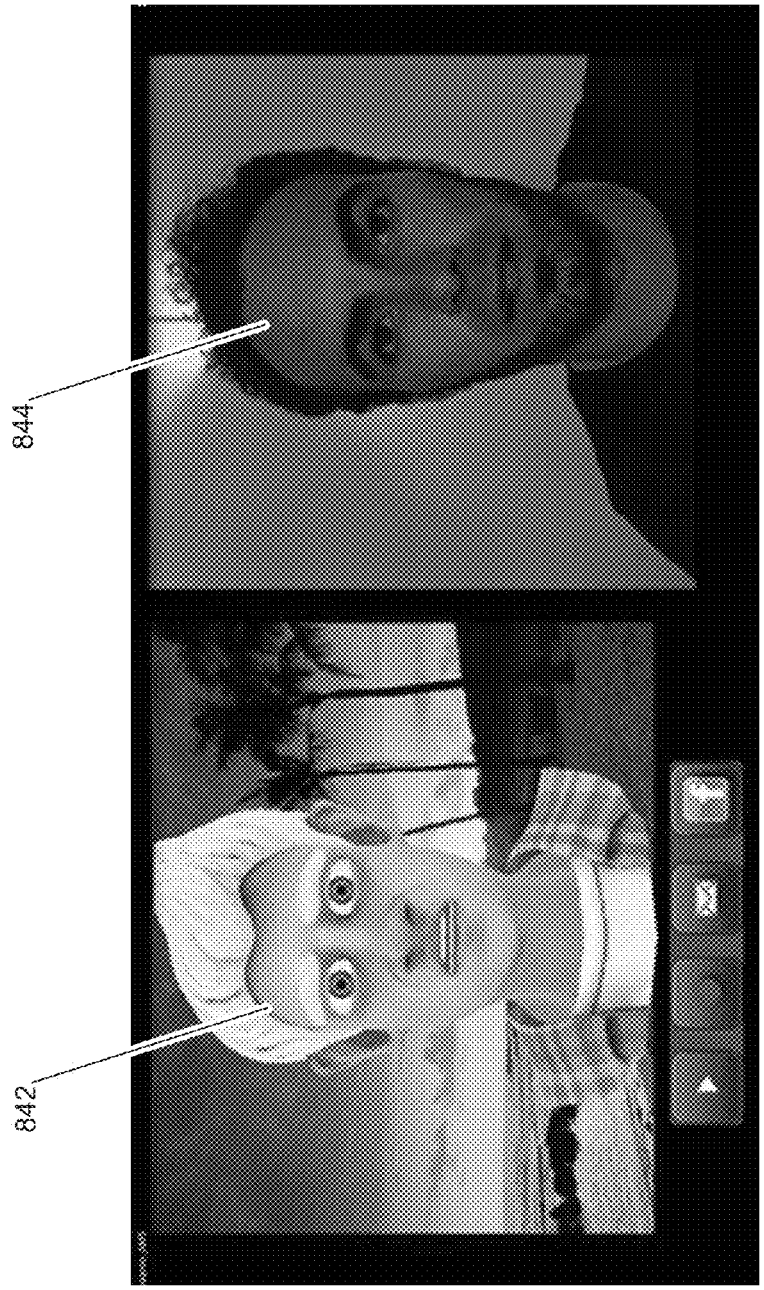
FIG. 8C is a screen shot illustrating a pose of a neutral human facial expression mirrored by a frame of character facial animation in accordance with an embodiment of the invention.

Side by side screenshots displaying an animated video message and the video images from which the animated video message is derived are illustrated in FIGS. 8A, 8B and 8C. FIG. 8A illustrates an animated video message 802 generated from a surprised human facial expression 804 captured within a video image. Similarly, FIG. 8B illustrates an animated video message 822 generated from an angry human facial expression 824 captured within a video image. Lastly, FIG. 8B illustrates an animated video message 842 generated from a neutral human facial expression 844 captured within a video image.

Although specific processes for rendering and display of animated video messages are discussed above, processes for rendering and display of animated video messages can be implemented in a variety of ways that are appropriate to the requirements of specific applications in accordance with embodiments of the invention. In many embodiments, the ability to collaboratively create animated video messages can be utilized in the collaborative creation of animated content and interactive animated video messages. Interactive animated video messages and processes for collaboratively creating animated video messages and interactive animated video messages in accordance with embodiments of the invention are discussed further below.

Interactive Animated Video Messages

Systems for generating animated video messages in accordance with many embodiments of the invention enable the collaborative creation of animated messages using multiple stages of sharing and distribution of content. In addition to modifying animations and content within an animated video message, systems for generating animated video messages can enable users to reuse, extend or augment portions of animated video messages for the purpose of creating additional content. In several embodiments, alternative animation sequences can be included in a single animated message to enable the interactive playback of the animated content based upon user selections. As can readily be appreciated, interactive animated messages are rich with content that can also be reused, extended or augmented to create additional animated content.

Figure 9:
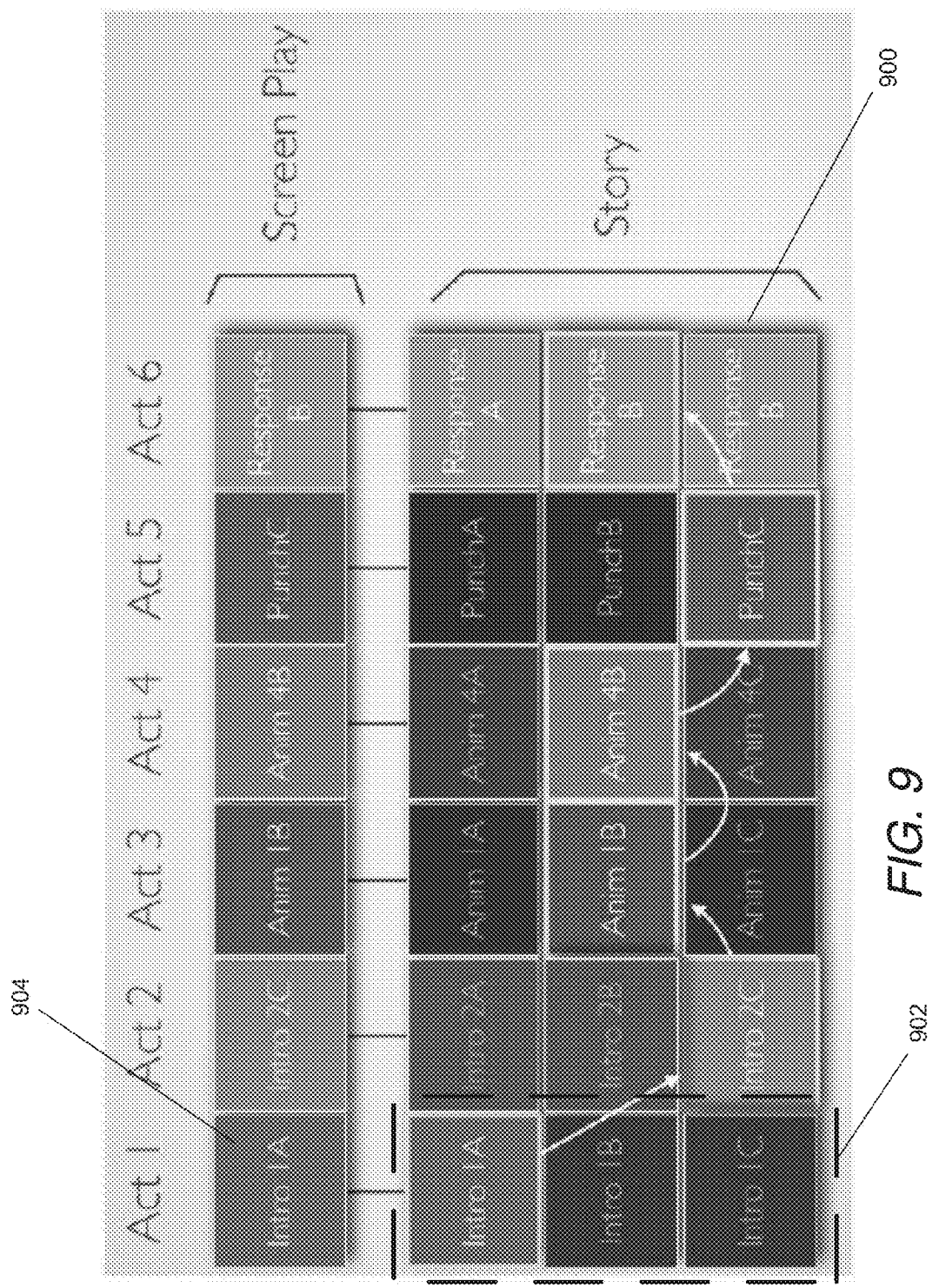
FIG. 9 conceptually illustrates an interactive animated video message in accordance with an embodiment of the invention. The story develops in a non-linear way where it could take different paths depending on the user interaction. The different options (e.g. Intro1A, Intro 1B, etc.) can be pre-generated or can be created interactively by the user.

An interactive animated video message in accordance with an embodiment of the invention is conceptually illustrated in FIG. 9. The interactive animated video message 900 includes six groupings (902) of animation sequences that can each be considered an act within the interactive animated video message. A user can select one (904) of the set of animation sequences in each act to cause the rendering and/or playback of a video sequence based upon the selections. In this way, a single interactive animated video message can be played back in a variety of different ways. In several embodiments, the playback of an interactive animated video message can be randomized. In many embodiments, a user that wishes to send an animated video message that is not interactive can effectively extract an animated video message from the content contained within the animated video message. As is the case with a non-interactive video message, the user can also extract a specific animation sequence from the interactive animated video message for reuse in another animated video message.

Although a specific interactive video message is illustrated in FIG. 9, any of a variety of interactive animated video messages and/or interactive video content can be generated in which alternative pieces of content are provided and the playback of content can be determined based upon user interaction including (but not limited) interactive video content including fewer or a greater number of acts, fewer or a greater number of alternative animation sequences and/or rendered video clips, and/or acts in which no alternative content is provided in accordance with embodiments of the invention. Processes for collaboratively generating animated video messages and content throughout the social graph through the use of animation sequences and/or video clips contained within animated video messages in accordance with embodiments of the invention are discussed further below.

Collaborative Message Creation

Animated video messages can be created collaboratively and animation sequences, and/or video clips within an animated video message can be further reused, extended or augmented to create additional animated video messages. In this way, various animation sequences can be seeded into the social graph and can become building blocks for the creation of an increasing array of content.

Figure 10:
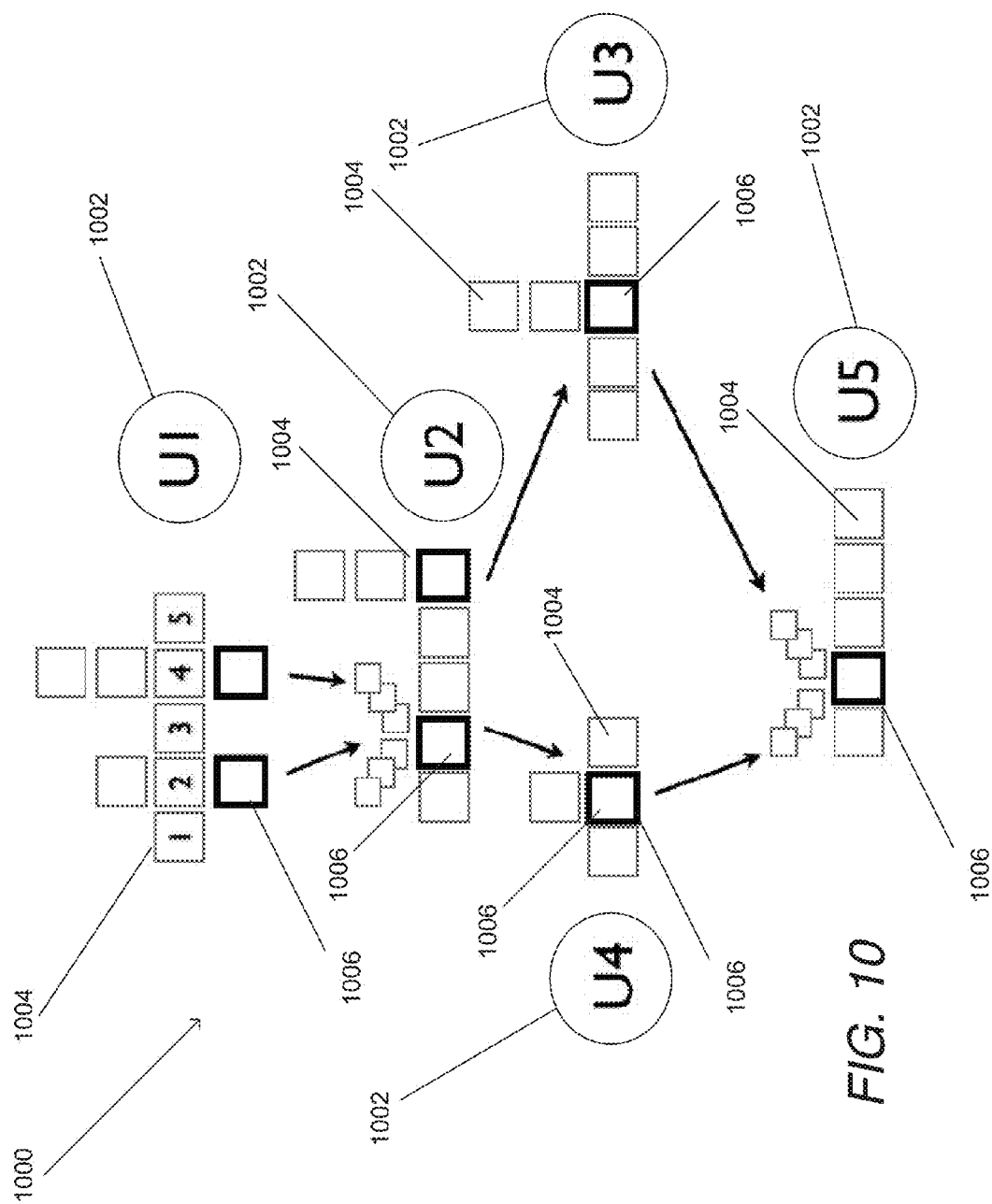
FIG. 10 conceptually illustrates the distribution of animated video messages and the reuse of animation sequences and/or video clips included within the distributed animated video messages to create additional animated video messages in accordance with embodiments of the invention. The distribution of the resulting animated video messages can involve end users, creators and users who have modified the story of the animated video message.

The propagation of animation sequences within animated video messages and the reuse of the animation sequences to create additional content using systems for generating animated video messages in accordance with an embodiment of the invention is conceptually illustrated in FIG. 10. The term social graph is used to describe a graph or data structure that describes personal relationships of users of a system. Many services including the Facebook service provided by Facebook, Inc. of Menlo Park, Calif. can enable the spread of content and information utilizing a social graph. Systems for generating animated video messages in accordance with embodiments of the invention can tap into a social graph to enable the distribution of animated video messages. In several embodiments, users 1002 distribute animated video messages 1004 to other users 1002 and reuse animation sequences within the animated video messages to create new animated video messages. With specific reference to the distribution of animated video messages shown in FIG. 10, the manner in which a single animation sequence 1006 that is part of an interactive video message is reused is illustrated. The five users 1002 each generate animated video messages and users U2-U5 generate animated video messages that incorporate the video sequence 1006 contained within the interactive animated video message distributed by U1 and/or a version of the video sequence modified using any of techniques described above. As can readily be appreciated, distribution of animated video messages in the manner illustrated in FIG. 10 via the social graph can result in the seeding of the social graph with a large number of animation sequences that can be reused by other users to generate animated video messages.

Although the above discussion of distribution of video messages and reuse, extension or augmentation of video sequences and/or video clips in relation to FIG. 10 is presented in the context of users of a social graph, systems for generating animated video messages can leverage the ad hoc social graph formed by the contacts that users maintain in email accounts, within other contact lists on mobile phones and messaging services, and/or within a animated video messaging application. Accordingly, the collaborative creation of animated video messages and the reuse, extension or augmentation of video sequences in the creation of animated video messages is not limited to systems that require distribution of animated video messages utilizing a social graph.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for generating animated video messages comprising:
    generating groupings of animation sequences, wherein:
        each grouping of animation sequences corresponds to an action in an animated sequence; and
        each animation within a grouping of animation sequences corresponds to an alternative way to perform the action corresponding to that grouping;
        receiving a user selection of an animation from each of the groupings of animation sequences; and
        creating an interactive animated video message using the user selected animations.

2. The method as recited in claim 1, wherein creating the interactive animated video message using the user selected animations comprises:
    generating motion data based on the user selected animations; and
    applying the motion data to a 3D character model to cause the 3D character model to perform the user selected animations.

3. The method as recited in claim 2, further comprising arranging the user selected animations based on an order of the groupings of animation sequences.

4. The method as recited in claim 2, further comprising randomizing an order of the user selected animations before generating the motion data.

5. The method as recited in claim 2, further comprising extracting an animation sequence from the interactive animated video message for reuse in another animated video message.

6. The method as recited in claim 2, further comprising transmitting the motion data to a remote device via a network interface.

7. The method as recited in claim 1, further comprising obtaining an animation within a grouping of animation sequences corresponding to an action by:
    receiving a sequence of video frames;
    detecting a human face within the sequence of the video frames;
    tracking, within the sequence of video frames, a facial expression change in the detected human face;
    mapping the tracked facial expression changes to 3D motion data; and
    applying the mapped 3D motion data to a 3D character model to cause the 3D character model to perform the animation.

8. The method as recited in claim 7, further comprising matching the detected facial expressions to a stored facial expression model from a database of stored facial expressions.

9. The method as recited in claim 8, further comprising obtaining, based on matching the detected facial expressions to the stored facial expression model, the mapped 3D motion data for the stored facial expression model.

10. The method as recited in claim 9, wherein the 3D character model comprises data that describes an articulated skeleton, at least one mesh, and skinning weights that indicate how the articulated skeleton deforms the at least one mesh for a given motion.

11. The method as recited in claim 10, wherein the articulated skeleton comprises a plurality of bones configured to rotate in one or more degrees of freedom around joints, and wherein the at least one mesh comprises a plurality of vertices defining a surface having a plurality of polygons.

12. The method as recited in claim 1, further comprising obtaining a description of a space of human faces and principal component analysis facial expressions using a training data set containing multiple images of human faces registered to a template image of a human face and multiple images of human facial expressions registered to the same template image of the human face.

13. A system for generating animated video messages, the system comprising:
    at least one processor; and
    at least one non-transitory computer-readable storage medium storing instructions that, when executed by the at least one processor, cause the system to:
    generate groupings of animation sequences, wherein:
        each grouping of animation sequences corresponds to an action in an animated sequence; and
        each animation within a grouping of animation sequences corresponds to an alternative way to perform action corresponding to that grouping; receiving a user selection of an animation from each of the groupings of animation sequences;
    create an interactive animated video message using the user selected animations; and
    transmit the interactive animated video message to a remote device via a network interface.

14. The system as recited in claim 13, further comprising instructions that, when executed by the at least one processor, cause the system to extract an animation sequence from the interactive animated video message for reuse in another animated video message.

15. The system as recited in claim 13, further comprising instructions that, when executed by the at least one processor, cause the system to:
    generate motion data based on the interactive animated video message; and
    apply the motion data to a 3D character model to cause the 3D character model to perform the actions of the interactive animated video message.

16. The system as recited in claim 13, further comprising instructions that, when executed by the at least one processor, cause the system to playback the interactive animated video message via a display device.

17. The system as recited in claim 13, further comprising instructions that, when executed by the at least one processor, cause the system to obtain an animation within a grouping of animation sequences corresponding to an action is by:
    receiving a sequence of video frames;
    detecting a human face within the sequence of the video frames;
    tracking, within the sequence of video frames, a facial expression change in the detected human face;
    mapping the tracked facial expression changes to 3D motion data; and
    applying the mapped 3D motion data to a 3D character model to cause the 3D character model to the animation.

18. The system as recited in claim 17, further comprising instructions that, when executed by the at least one processor, cause the system to match the detected facial expressions to a stored facial expression model from a database of stored facial expressions.

19. The system as recited in claim 18, further comprising instructions that, when executed by the at least one processor, cause the system to obtain, based on matching the detected facial expressions to the stored facial expression model, the mapped 3D motion data for the stored facial expression model.

20. The system as recited in claim 19, wherein the 3D character model comprises data that describes an articulated skeleton, at least one mesh, and skinning weights that indicate how the articulated skeleton deforms the at least one mesh for a given motion.

21. The system as recited in claim 20, wherein the articulated skeleton comprises a plurality of bones configured to rotate in one or more degrees of freedom around joints, and wherein the at least one mesh comprises a plurality of vertices defining a surface having a plurality of polygons.

22. The system as recited in claim 13, further comprising instructions that, when executed by the at least one processor, cause the system to obtain a description of a space of human faces and principal component analysis facial expressions using a training data set containing multiple images of human faces registered to a template image of a human face and multiple images of human facial expressions registered to the same template image of the human face.

23. A method for generating animated videos comprising:
generating groupings of animation sequences, wherein:
  each grouping of animation sequences corresponds to an action in a sequence of animations; and
  each animation within a grouping of animation sequences corresponds to an alternative way to perform the action corresponding to that grouping;
receiving a user selection of an animation from each of two or more of the groupings of animation sequences;
creating an interactive animated video using the user selected animations;
generating motion data based on the interactive animated video and;
applying motion data to animate a 3D character model to cause the 3D character model to perform the user selected animations of the interactive animated video.

24. The method as recited in claim 23, further comprising playing back, via a display device, the animated 3D character model performing the actions of the interactive animated video.

25. The method as recited in claim 23, further comprising transmitting the motion data to a remote device via a network interface.

26. The method as recited in claim 23, further comprising arranging the user selected animations based on an order of the groupings of animation sequences before generating the motion data.

27. The method as recited in claim 23, further comprising obtaining an animation within a grouping of animation sequences corresponding to an action by:
receiving a sequence of video frames;
detecting a human face within the sequence of the video frames;
tracking, within the sequence of video frames, a facial expression change in the detected human face; mapping the tracked facial expression changes to 3D motion data; and
applying the mapped 3D motion data to a 3D character model to cause the 3D character model to the animation.

* * * * *